(12) United States Patent
King et al.

(10) Patent No.: US 8,014,518 B2
(45) Date of Patent: Sep. 6, 2011

(54) PATCH PANEL APPARATUS AND SYSTEM INCLUDING PATCH CORD PATH TRACING

(75) Inventors: Graham King, Clifton, VA (US); Simon Tiley, New Windsor, MD (US); Robert Russ, Stafford, VA (US); Lehi Davis, Front Royal, VA (US)

(73) Assignee: NSGDATACOM, Inc., Chantilly, VA (US)

( * ) Notice: Subject to any disclaimer, the term of this patent is extended or adjusted under 35 U.S.C. 154(b) by 1199 days.

(21) Appl. No.: 11/441,059

(22) Filed: May 26, 2006

(65) Prior Publication Data

US 2007/0286411 A1 Dec. 13, 2007

(51) Int. Cl.
*H04M 9/00* (2006.01)
*H04M 1/00* (2006.01)

(52) U.S. Cl. ......... 379/413.02; 379/413.04; 379/399.01; 709/200; 709/250; 340/687

(58) Field of Classification Search ............... 439/491, 439/49; 379/25, 27.01, 156, 326, 381, 413, 379/399.01; 340/687; 709/200, 250; 370/248
See application file for complete search history.

(56) References Cited

U.S. PATENT DOCUMENTS

| | | | | |
|---|---|---|---|---|
| 6,222,908 B1 * | 4/2001 | Bartolutti et al. | ......... | 379/27.01 |
| 6,234,830 B1 * | 5/2001 | Ensz et al. | ..................... | 439/491 |
| 6,285,293 B1 * | 9/2001 | German et al. | ............... | 340/687 |
| 6,330,307 B1 * | 12/2001 | Bloch et al. | ..................... | 379/25 |
| 6,424,710 B1 * | 7/2002 | Bartolutti et al. | ............. | 379/326 |
| 6,522,737 B1 * | 2/2003 | Bartolutti et al. | ............. | 379/156 |
| 6,688,910 B1 * | 2/2004 | Macauley | ..................... | 439/491 |
| 7,455,527 B2 * | 11/2008 | Nordin et al. | .................... | 439/49 |
| 2002/0071394 A1 * | 6/2002 | Koziy et al. | ..................... | 370/248 |
| 2002/0090858 A1 * | 7/2002 | Caveney | ..................... | 439/490 |
| 2003/0061393 A1 * | 3/2003 | Steegmans et al. | ........... | 709/250 |
| 2003/0112965 A1 * | 6/2003 | McNamara et al. | ..... | 379/399.01 |
| 2004/0073597 A1 * | 4/2004 | Caveney et al. | ............. | 709/200 |

OTHER PUBLICATIONS

Webopedia (The online encyclopedia dedicated to computer technology), After Power Failure, Last Modified Sep. 9, 2008, Accessed Oct. 13, 2009, www.webopedia.com/TERM/A/After_Power_Failure. html.*

* cited by examiner

*Primary Examiner* — Ahmad F Matar
*Assistant Examiner* — Kharye Pope
(74) *Attorney, Agent, or Firm* — Albrecht Tousi & Farnum PLLC

(57) ABSTRACT

A patch panel apparatus, system, method and computer program product for patch cord path tracing is provided.

28 Claims, 13 Drawing Sheets

Exemplary Embodiment of a Patch Panel for Cat5 Ethernet according to the present invention Exemplary Embodiment of a Patch Panel for Cat5 Ethernet according to the present invention

PATCH PANEL APPARATUS AND SYSTEM INCLUDING PATCH CORD PATH TRACING

BACKGROUND OF THE INVENTION

1. Field of the Invention

The present invention relates generally to communications and, more particularly, to communications patch panels.

2. Related Art

Wired line communications involves modulating signals over wires. In a given conventional office building having several hundred offices, often as many as two to three communication wires may be run from each office to a wiring closet. In some cases a building may have a wiring closet on each floor and then the wiring closets may run communications wires vertically through a backbone to a floor housing a datacenter and/or a private branch exchange (PBX). Thus, telephone twisted pair wiring, as well as local area network (LAN) data wiring such as, e.g., but not limited to, Ethernet wiring, may be run from each office back to a wiring closet. A patch panel is a device conventionally used to organize the potentially hundreds of wires, cable, or twisted pair. The patch panel may conventionally be used to easily connect customer premises wiring to customer premises equipment (CPE). The patch panel may conventionally be used as a central point of termination of wiring. Patch panels conventionally permit manual or semi-manual connection of equipment such as, e.g., but not limited to, a PBX, or a computer server to devices such as, e.g., but not limited to, telephones (such as digital and/or analog), or workstation client computers on a local area network. Some patch panels allow patch cords to be used to couple together different devices connected to a patch panel. Unfortunately, when using a large number of patch cords, it can become very difficult to identify the initiating and terminating ends of a particular patch cord. What is needed then is an improved way to identify the ports associated with initiating and terminating ends of patch cords in a wired patch panel, which overcomes this and other shortcomings of conventional patch panels.

SUMMARY OF THE INVENTION

The present invention sets forth various exemplary embodiments of apparatuses, systems, methods and computer program products for providing tracing of a patch cord on a patch panel.

An exemplary embodiment of the present invention sets forth a patch panel apparatus, which may include: a plurality of first ports; a plurality of patch ports; an electronic monitor of the plurality of the first ports and/or the plurality of the patch ports, for existence of a patch cord in the patch ports.

In an exemplary embodiment of the patch panel, the plurality of the first ports and the plurality of the patch ports are part of at least two separate patch panels.

In an exemplary embodiment, the patch panel may include where the plurality of the first ports are part of a first portion of a first patch panel and the plurality of the patch ports are part of a second portion of the first patch panel and/or a second patch panel.

In an exemplary embodiment, the patch panel may include where the first portion may include a panel, a first panel, a second panel, a front panel, a back panel, a left section, a right section, a top section, a bottom section, a rear portion, a front portion, a top portion, a bottom portion, a left portion, and/or a right portion, and wherein the second portion may include a panel, a first panel, a second panel, a front panel, a back panel, a left section, a right section, a top section, a bottom section, a rear portion, a front portion, a top portion, a bottom portion, a left portion, and/or a right portion.

In an exemplary embodiment, the patch panel may further include an indicator.

In an exemplary embodiment, the patch panel may include where the indicator may include a light emitting diode (LED); a single color indicator; a multicolor indicator; at least one pixel, an alphanumeric textual indication; an liquid crystal display (LCD) indicator; a cathode ray tube (CRT); an indicator on a patch cord; a lamp; a bulb; a remote indication; a local indication; a database field; a display; and/or a light.

In another exemplary embodiment, the patch panel may include where the indicator is operative to indicate activity on the plurality of the first ports; an indication of existence of a patch cord in the plurality of the patch ports; an indication of a powered on status of the panel; and/or an indication of a power over ethernet (POE) enabled port.

In an exemplary embodiment, the patch panel may further include: a plurality of first indicators corresponding to the plurality of first ports, and a plurality of second indicators corresponding to the plurality of patch ports.

In an exemplary embodiment, the patch panel may include where a first indicator is adapted to indicate when activity exists on a corresponding one of the first ports.

The apparatus according to claim 1, wherein the patch ports and/or the first ports comprise: an equipment port; a line port; a premises wiring port; a 110-type punch-down block; an RJ-45 connection port; an RJ-46 connection port, an IBM Cabling System-type port; a port; an RJ-11 connection port; a building wiring port; a host computer port; a private branch exchange port; a data port; a telephony port; a DB-25 port; an RJ-68 port; and/or an electronic connector port.

In an exemplary embodiment, the patch panel may further include a requester adapted to request a trace of a patch cord; wherein the electronic monitor is adapted to determine a first end and/or a second end of the patch cord, and upon receipt of the request of the trace adapted to indicate the location of the first end and/or the second end of the patch cord.

In an exemplary embodiment, the patch panel may include where the requester may include: a button, an electronic request, a trace request, an icon, a software application, and/or a switch.

In an exemplary embodiment, the patch panel may further include a plurality of buttons corresponding to the plurality of patch ports, wherein the plurality of first buttons are adapted to upon depression indicate locations of a first end and a second end of a patch cord.

In an exemplary embodiment, the patch panel may include where the patch panel may include a controller adapted to control power from a DC voltage power supply and to inject power over ethernet (POE) in a direction toward customer premises equipment (CPE), of the plurality of the first ports.

In an exemplary embodiment, the patch panel may include where the power is injected onto pins of the plurality of the first ports.

In an exemplary embodiment, the patch panel may include where the power is injected onto pins of the plurality of the first ports and onto the plurality of the second ports.

In an exemplary embodiment, the patch panel may include where the patch panel may include an electronic coupling between a first of the plurality of the first patch ports and a first of the plurality of the first ports.

In an exemplary embodiment, the patch panel may include where the electronic coupling may include: a relay; a switched relay; a latched switched; a connection; an electrical connection; an electronic connection; a cross-bar switch; an integrated circuit (IC); a chip; a gate; a matrix switch; an electromechanical connection; a software controlled connection; and/or a coupling.

In an exemplary embodiment, the patch panel may include where the electronic coupling may include a coupler adapted to retain and/or go to a predefined position of coupling in the event of a power failure.

In an exemplary embodiment, the patch panel may include where the electronic coupling may include a means for coupling may include a means for retaining and/or a means for going to a predefined position of coupling in the event of a power failure.

In an exemplary embodiment, the patch panel may include where the patch panel may include where the electronic coupling may include a switched relay, a latching switched relay, a matrix switch, an integrated circuit (IC), a chip, a gate, a low impedance pass, and/or a crossbar switch.

In an exemplary embodiment, the patch panel may include where the patch panel may include being adapted to automatically switch from a pre-defined coupling to a patched coupling upon electrically recognizing via the electronic monitoring, insertion of the inserted patch cord.

In an exemplary embodiment, the patch panel may include where the pre-defined coupling is decoupled only upon insertion of a later of the first and second ends of the inserted patch cord.

In an exemplary embodiment, the patch panel may include where a method of tracing an inserted patch cord through a patch panel having a plurality of patch ports may include: monitoring electronically a plurality of patch ports for insertion of an inserted patch into first and/or second patch ports; receiving a request for a race of a patch; and providing an indication corresponding to a first and a second patch port associated with the patch.

In an exemplary embodiment, the patch panel may include where the receiving a request for the trace may include: receiving a depression of a first button corresponding to the first patch port of the patch and/or a second button corresponding to the second patch port of the patch.

In an exemplary embodiment, the patch panel may include where the providing an indication may include: illuminating a pair of indicators corresponding the first and the second patch ports. In an exemplary embodiment, the patch panel may include where a method of providing power over Ethernet (POE) to a plurality of ports may include: providing a patch panel having a plurality of ports, the patch panel may include a controller adapted to control a DC voltage power supply; injecting controlled DC voltage power from the patch panel in a direction toward a customer premises equipment (CPE), of the plurality of ports, wherein the ports are electronically monitored for insertion of an inserted patch cord into first and/or second patch ports.

In an exemplary embodiment, the patch panel may further include receiving a request for a trace of a patch; and providing an indication corresponding to the two patch ports associated with the patch.

Another exemplary embodiment of the present invention sets forth a machine-readable medium that provides instructions, which when executed by a computing platform, cause the computing platform to perform operations may include a method of tracing an inserted patch cord through a patch panel having a plurality of patch ports may include: monitoring electronically a plurality of patch ports for insertion of an inserted patch into first and/or second patch ports; receiving a request for a trace of the patch; and providing an indication corresponding to the first and/or second patch ports.

BRIEF DESCRIPTION OF THE FIGURES

Various exemplary features and advantages of the invention will be apparent from the following, more particular description of exemplary embodiments of the present invention, as illustrated in the accompanying drawings wherein like reference numbers generally indicate identical, functionally similar, and/or structurally similar elements. The left most digits in the corresponding reference number indicate the drawing in which an element first appears.

DETAILED DESCRIPTION OF VARIOUS EXEMPLARY EMBODIMENTS OF THE INVENTION

Figure 1:
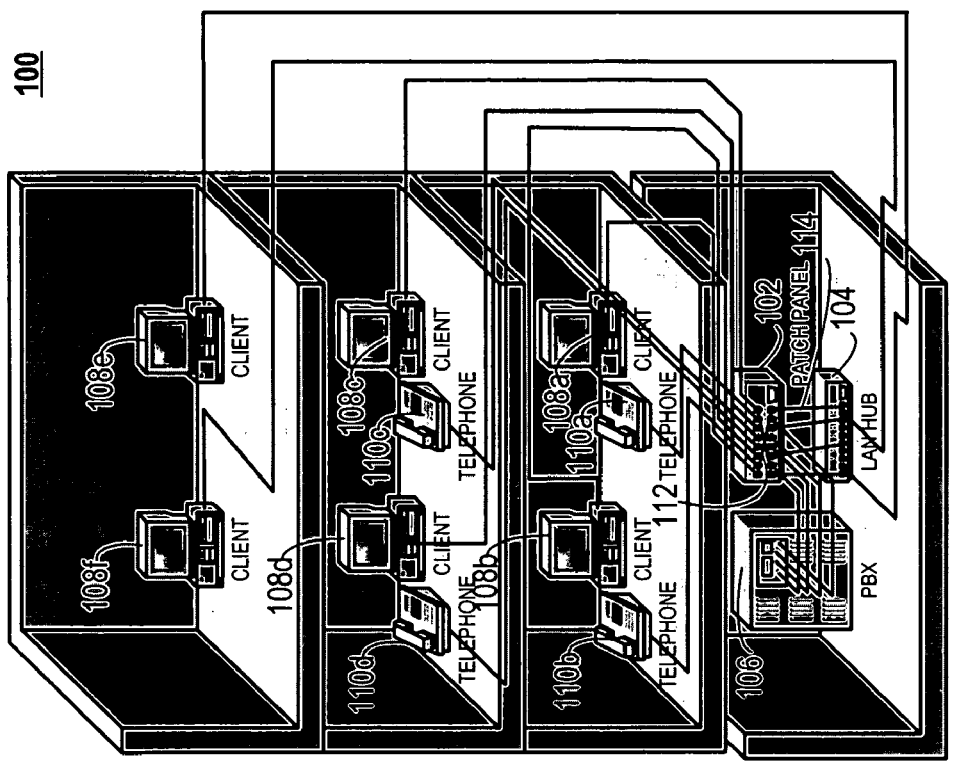
FIG. 1 depicts an exemplary embodiment of a diagram illustrating an exemplary network environment including a patch panel, and various workstation and telephony devices coupled via the patch panel, according to an exemplary embodiment of the present invention.

A preferred exemplary embodiment of the invention is discussed in detail below. While specific exemplary embodiments are discussed, it should be understood that this is done for illustration purposes only. A person skilled in the relevant art will recognize that other components and configurations may be used without parting from the spirit and scope of the invention.

Overview of an Exemplary Embodiment of the Patch Panel of the Present Invention

An exemplary embodiment of the present invention sets forth a patch panel adapted to include, e.g., but not limited to functionality which may provide patch-cord trace-ability, automatic patch-detect, activity indicating light emitting diode (LED) indicators, an optional "normally through connect" or "pure patch" exemplary embodiments, and/or optional mid-span power over ethernet (POE) injection points which may be IEEE 802.3af compliant.

In an exemplary embodiment, patch panel 102 may include a Cat-5 (or Cat-5e/6) Patch, available from NSGDatacom, Inc. of 3863 Centerview Drive, Chantilly, Va. 20151. The Cat-5 Patch, in an exemplary embodiment, may include a 19-inch rack mounting, 24 channel 4 wire RJ-45 through patch panel, for local area network (LAN) or telephone environment. The patch panel may comply with category 5 cabling. The connections may be set up in accordance with the specification TIA/EIA 568B.

The patch, according to an exemplary embodiment, may be a 4-wire patch, making it suitable for use with, e.g., but not limited to, ethernet and/or telephone circuits. A series of movable headers may be used to select ethernet or telephone. Each channel can be set separately for mixed environments. Although only 4 wires are patched, a standard 8-wire RJ45 cable, or 10-wire RJ46 cable, etc., may be used for the patch, according to an exemplary embodiment. The patch cords used in an exemplary embodiment, may be standard RJ-45 to RJ-45 cables. The "spare" wires may be used for extra functions within the patch panel. Patch cords are available from NSGDatacom, Inc. and may be obtained in, e.g., but not limited to, standard 1, 2 or 3-Meter lengths, etc.

Exemplary features of the patch panel 102 according to an exemplary embodiment of the present invention may include:

1. Patch-cord trace-ability;
2. Automatic patch-detect;
3. Activity LED indicators;
4. Optional "normally through connect" or "pure patch"; and/or
5. Optional Mid-span POE (Power Over Ethernet) injection point. (IEEE 802.3af).

In an exemplary embodiment, the "normally through connected" version of the present invention, the top and bottom rows of RJ-45 sockets may be directly coupled to one another until a patch cord is inserted at which time the through connection may be automatically disconnected or decoupled. In another exemplary embodiment, a "pure patch" version, no initial connections may be made, until a patch cord is inserted.

Using the patch cord traceability feature, according to an exemplary embodiment of the present invention, may entail, in an exemplary embodiment, pressing a switch at one end of a patch cord, which may result in an LED illuminating at the other end for patch cord trace-ability.

According to an exemplary embodiment, the normally through connected version may make most sense when a patch panel installation may cover a single, simple LAN network, which may help ensure a clean initial installation. The pure patch version may fit in better where there may be multiple networks, especially when connecting individual users to more than one network at their work space location. In the latter case the Patch tracing feature may be of particularly great benefit in finding connections, once the installation of many patch cords has occurred.

The Cat-5 Patch, according to an exemplary embodiment, may come in several versions. The patch panel 102, in an exemplary embodiment, can patch shielded and/or unshielded cable and can be provided with "Insulation displacement connectors (110-D)" or RJ-45 connectors on the rear panel, for the hub wiring connection, simplifying installation as hub patch panels.

In another exemplary embodiment, the patch panel 102 may include an optional power over ethernet (POE) interface for a POE controller.

FIG. 1 depicts an exemplary embodiment of a diagram 100 illustrating an exemplary network environment including a patch panel 102, and various exemplary computing workstations 108*a-f* (although labeled as clients, such computing devices may equally serve as a server type device) and exemplary telephony devices 110*a-d* coupled (although shown coupled via what may be electrical wired connections, any conventional network coupling may be used including, e.g., but not limited to, wire, cable, twisted pair, optical fiber, etc.) via the patch panel 102, according to an exemplary embodiment of the present invention. In in an exemplary embodiment customer premises equipment (CPE) such as, e.g., but not limited to, a personal branch exchange (PBX), may be coupled to the computing devices 108, and/or telephony devices 110, via the patch panel, and other devices, which may include, e.g., but not limited to, a local area network (LAN) hub. As shown, patch panel 102 may include one or more patch cords 112 which may be used to modify connections between various devices. As shown, patch cords connect client 108*a* to the LAN hub 104, and client 108*c* via another port in the patch panel also to the LAN hub 104.

Figure 2:
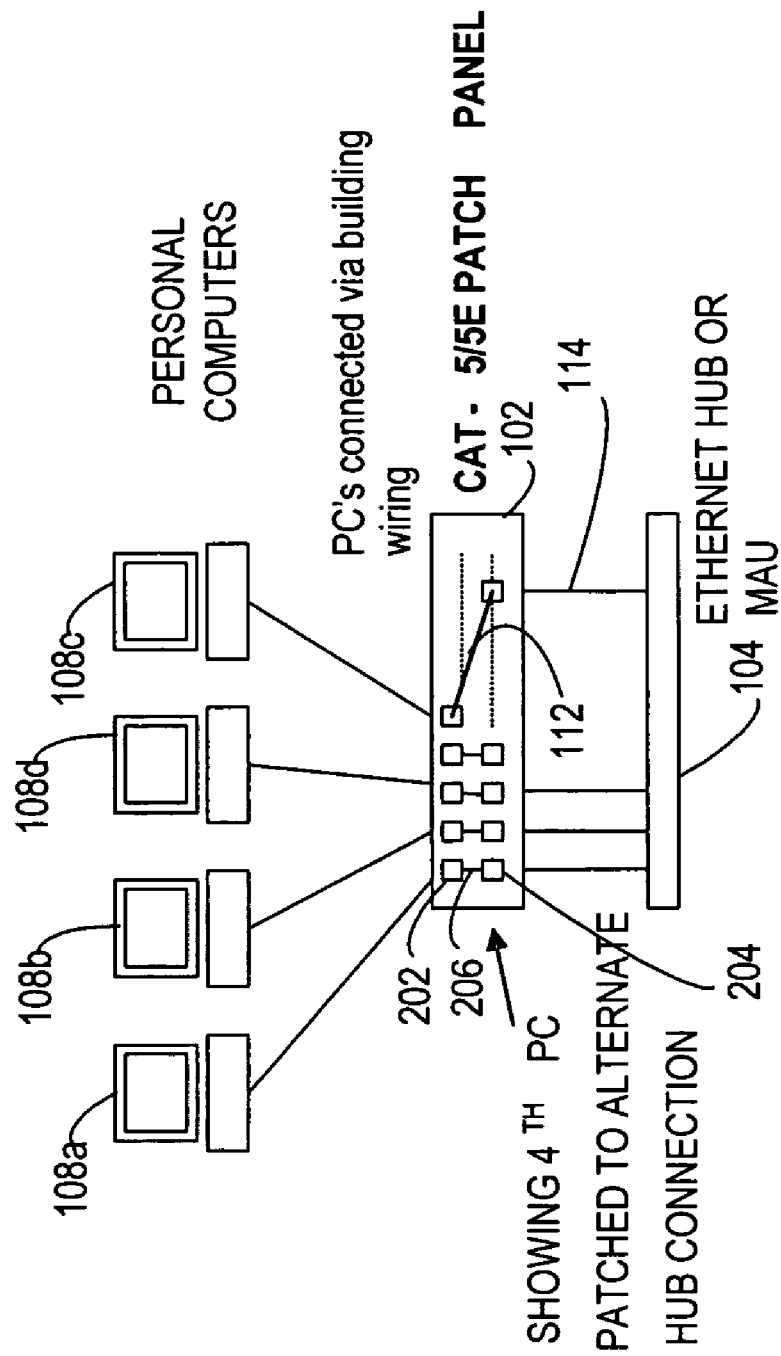
FIG. 2 depicts an exemplary embodiment of a high level block diagram illustrating an exemplary patch panel coupling various computing devices and a network hub including a patch to an alternate connection.

FIG. 2 depicts an exemplary embodiment of a high level block diagram 200 illustrating an exemplary patch panel 102 coupling various computing devices 108*a-d* and a network hub 104. Diagram 200 illustrates an exemplary normally through connection of computing device 108*a* via port 202, via through connect 206, to port 204. Diagram 200 illustrates an exemplary patch of the fourth device 109*c* to an alternate hub connection. Specifically, diagram 200 includes a patch cord 112 patching computing device 108*c* from a normal pass through connection to anoth port of patch panel 102 to couple via wiring 114 to a port of hub 104 to an alternate connection.

Figure 3:
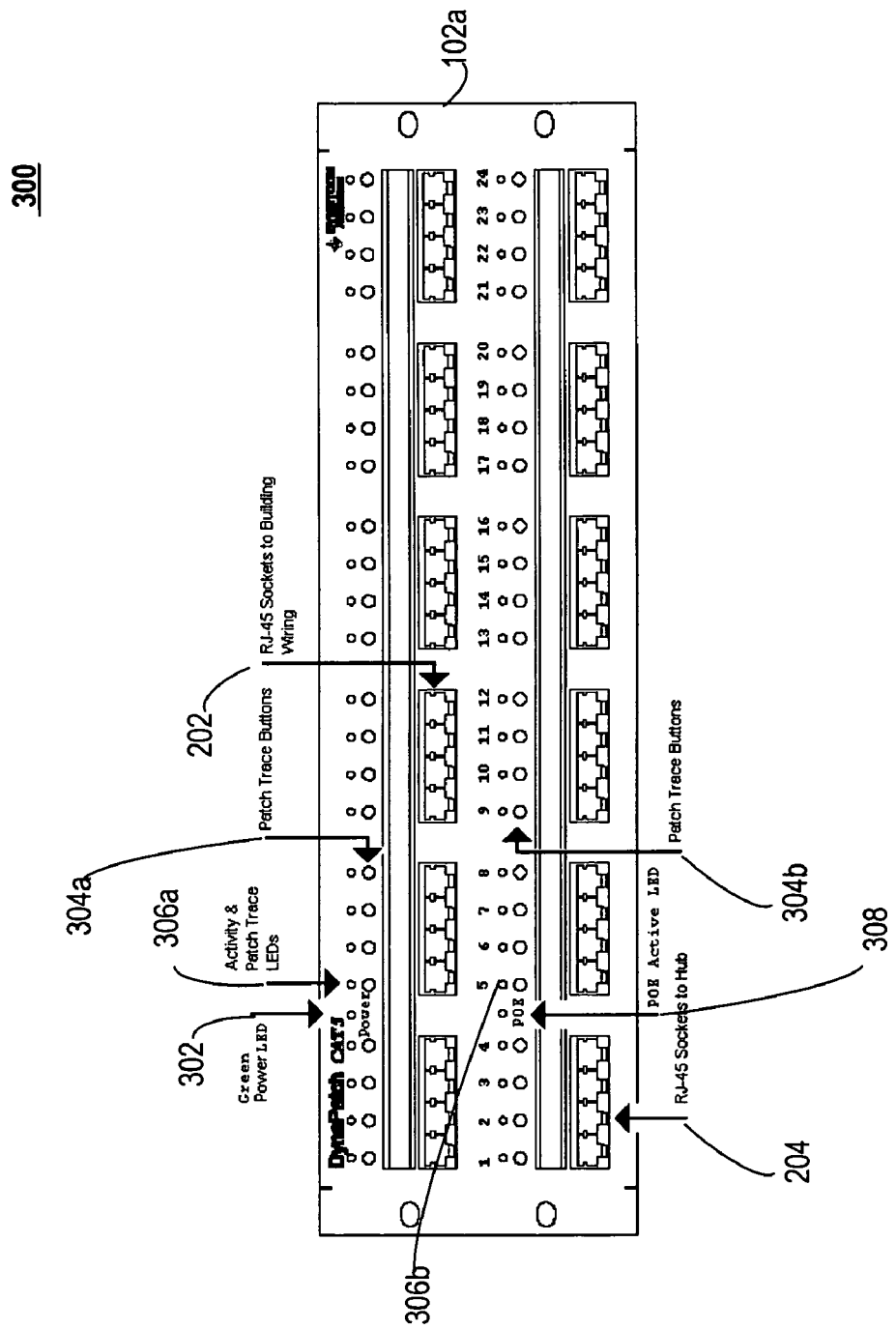
FIG. 3 depicts an exemplary embodiment of a diagram illustrating a front panel view of an exemplary patch panel device according to an exemplary embodiment including exemplary sockets (e.g., but not limited to, RJ-45 sockets to building wiring, and sockets to a networking hub), light emitting diodes (LEDs), patch trace buttons, a power over ethernet (POE) indicator, according to an exemplary embodiment of the present invention.

FIG. 3 depicts an exemplary embodiment of a diagram 300 illustrating a front panel view 102*a* of an exemplary patch panel device 102. Diagram 300, in an exemplary embodiment may include a power on indicator 302, which in an exemplary embodiment may be a green power light emitting diode (LED). Diagram 300, according to an exemplary embodiment, may include exemplary sockets 202, 204, including, e.g., but not limited to, RJ-45 sockets 202 to building wiring, and sockets 204 to a networking hub 104, etc. Diagram 300 illustrates, in an exemplary embodiment, exemplary light emitting diodes (LEDs) 306a, which, in an exemplary embodiment, may indicate port activity and/or may indicate patch tracing. Diagram 300 illustrates exemplary patch trace buttons which may be used to identify an originating and terminating end of a patch cord by illuminating the corresponding LEDs 306a. Diagram 300 may also include, in an exemplary embodiment, a power over ethernet (POE) indicator, which may indicate the active capability of POE, according to an exemplary embodiment of the present invention.

In an exemplary embodiment, the Cat-5 Patch panel, may include two rows of 24 RJ-45 sockets, which may be mounted on a 3U high, 19-inch rack mountable, front panel, together with some associated circuitry, as depicted in FIG. 3. The top row of RJ45 sockets, in an exemplary embodiment, may, depending on the version selected, be through connected to the corresponding RJ-45 socket on the lower row of RJ-45 sockets, or may not be through connected.

Figure 4:
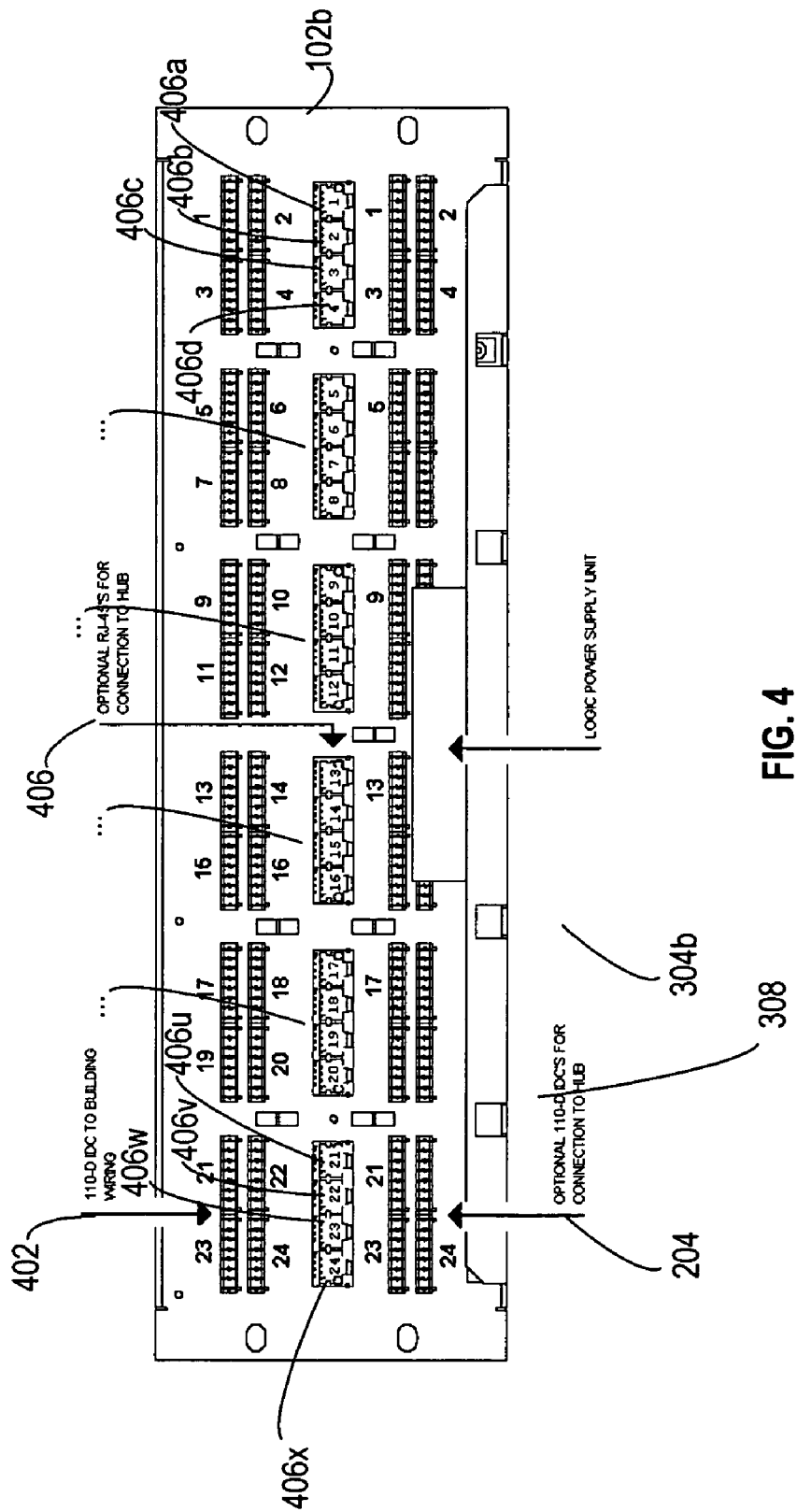
FIG. 4 depicts an exemplary embodiment of a diagram illustrating a rear panel view of an exemplary patch panel device according to an exemplary embodiment including exemplary connectors (e.g., but not limited to, insulation displacement connectors (IDC) type 110-D, or RJ-45 connectors to building wiring, and IDCs for connection to a networking hub), and a logic power supply unit, according to an exemplary embodiment of the present invention.

FIG. 4 depicts an exemplary embodiment of a diagram 400 illustrating a rear panel view 102b of an exemplary patch panel device 102 according to an exemplary embodiment. Diagram 400 in an exemplary embodiment may include, e.g., but not limited to, exemplary connectors which may include, e.g., but not limited to, insulation displacement connectors (IDC) type 110-D connectors 402, (and/or RJ-45 connectors 406 depending on jumper settings), which may be used, in an exemplary embodiment, to couple building wiring to the patch panel 102. In an exemplary embodiment, IDCs 404 may be used for connection to a networking hub 104. According to an exemplary embodiment of the present invention, RJ-45 connectors 406s may be optionally provided for connection or coupling to hub 104. Diagram 400 may include a logic power supply unit 408, according to an exemplary embodiment of the present invention.

The top row of connectors depicted in FIG. 3, may be connected, or coupled, via "house wiring" to personal computers which may be distributed around the building, as shown in FIG. 1, using, in an exemplary embodiment, insulation displacement connectors (IDC), such as, e.g., but not limited to, type IDC 110-D, in an exemplary embodiment, on the rear of the patch panel, as shown in FIG. 4. The lower row of connectors of FIG. 3 may be normally connected using, e.g., but not limited to, an optional additional RJ-45, and/or an insulation displacement connector (IDC) type 110-D, which may also be on the rear of the panel, as shown in FIG. 4, and may be thereby coupled to, e.g., but not limited to, an Ethernet Hub, and/or a Telephone PBX, etc.

Figure 5:
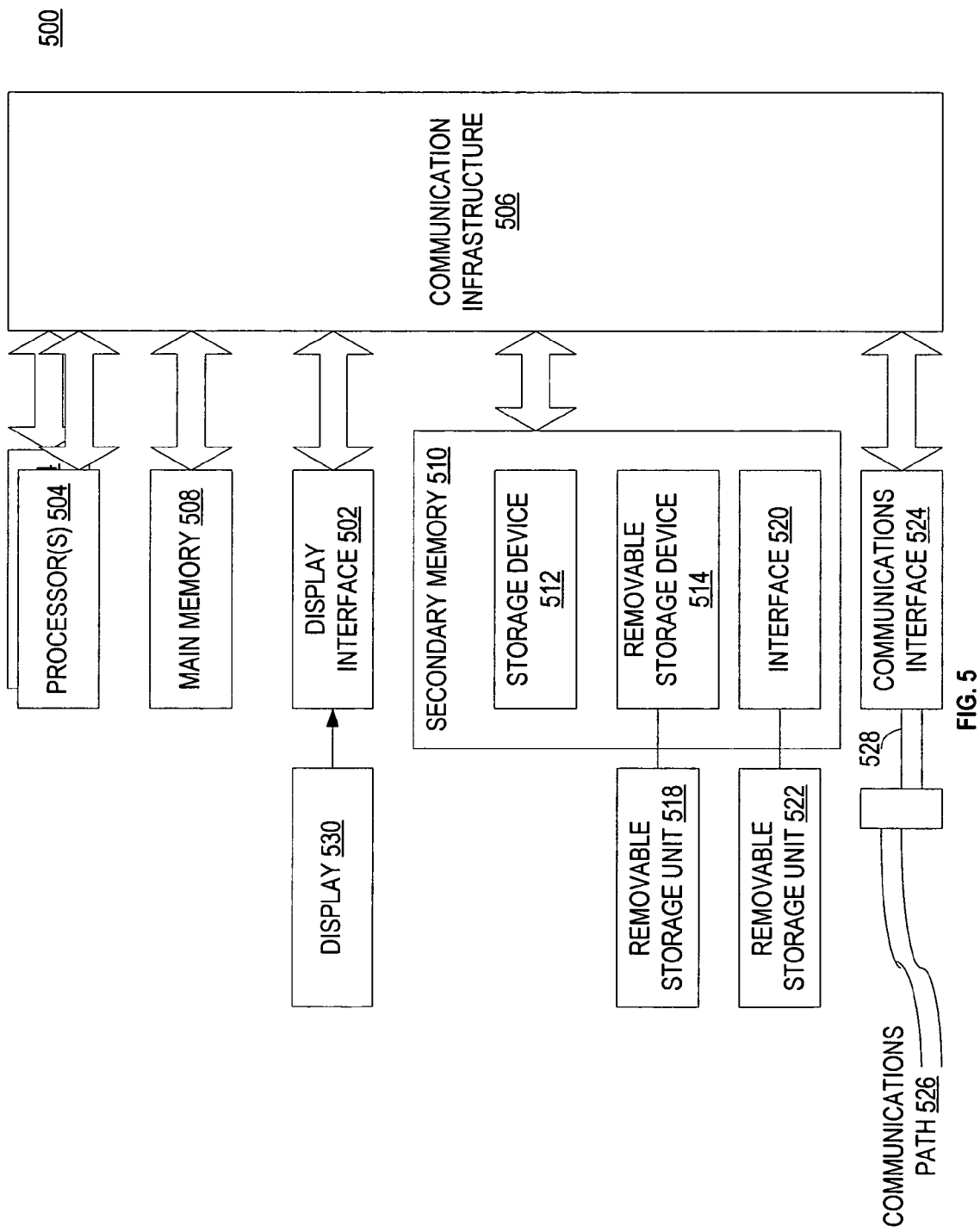
FIG. 5 depicts an exemplary embodiment of a diagram illustrating a computer system that may be used in computing devices such as, e.g., client and/or server computer workstation devices as may be coupled to the patch panel according to an exemplary embodiment of the present invention.

FIG. 5 depicts an exemplary embodiment of a diagram 500 illustrating a computer system that may be used in computing devices such as, e.g., client and/or server computer workstation devices 108, 110 as may be coupled to the patch panel according to an exemplary embodiment of the present invention. Further details are set forth below following the description of FIG. 10.

Figure 6:
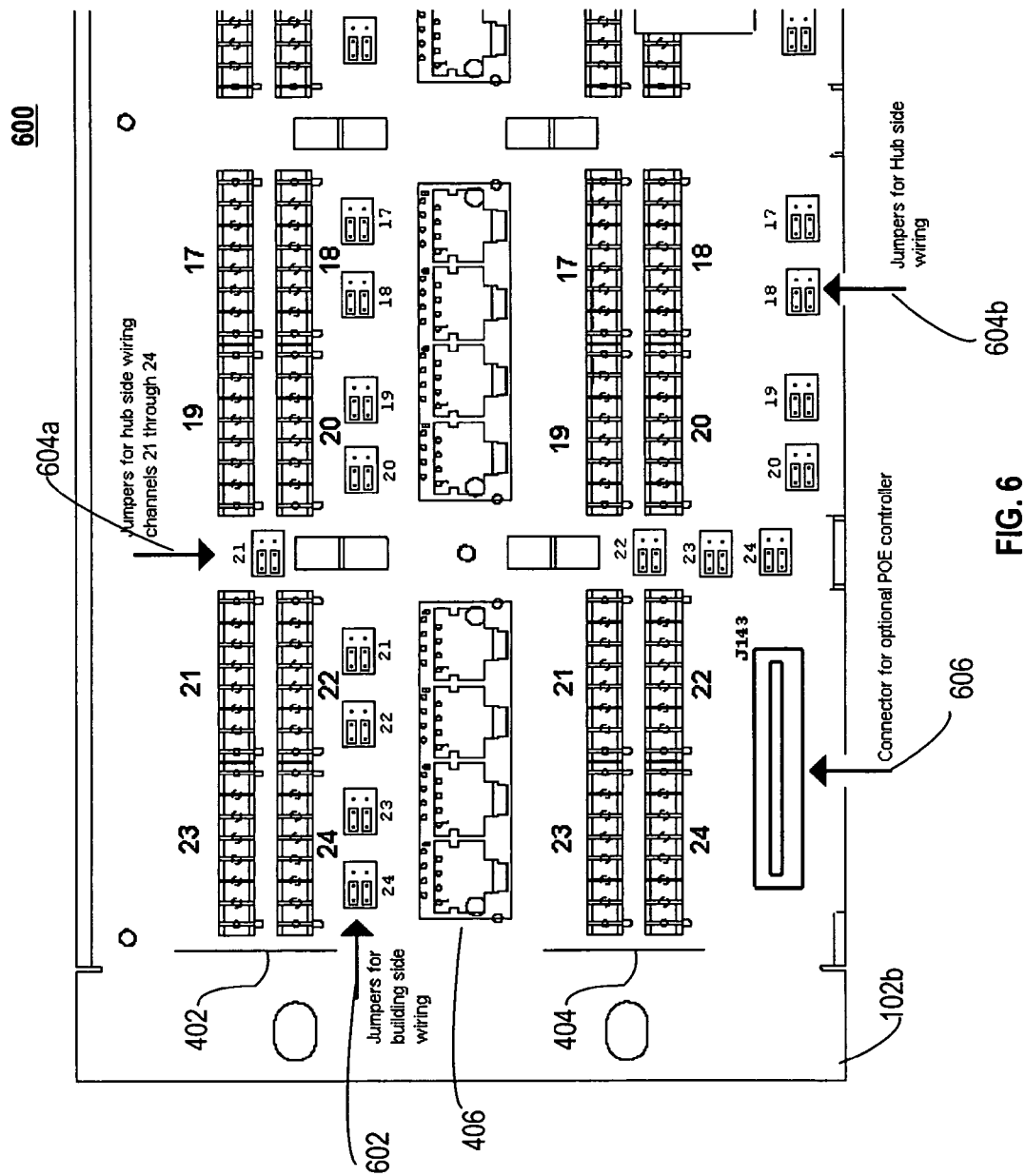
FIG. 6 depicts an exemplary embodiment of a diagram illustrating a more detailed view of a left side of the rear view of the patch panel depicted in FIG. 4, including connectors as described with reference to FIG. 4, jumpers (including, e.g., but not limited to, for selection of voice or data for a port, for building side wiring, or hub side wiring), and a connection for an optional power over ethernet (POE) controller, according to an exemplary embodiment of the present invention.

FIG. 6 depicts an exemplary embodiment of a diagram 600 illustrating a more detailed view of an exemplary left side of the rear view 102b of the patch panel 102 depicted in FIG. 4, which may include connectors 402, 404, and 406 as described with reference to FIG. 4. Diagram 600 may include jumpers 602 (in an exemplary embodiment, jumpers may include, e.g., but not limited to, jumpers 602 for building side wiring, and/or jumpers 604a,604b for hub side wiring). Diagram 600, in an exemplary embodiment, may include a connection 606 for an optional power over ethernet (POE) controller, according to an exemplary embodiment of the present invention.

Figure 7:
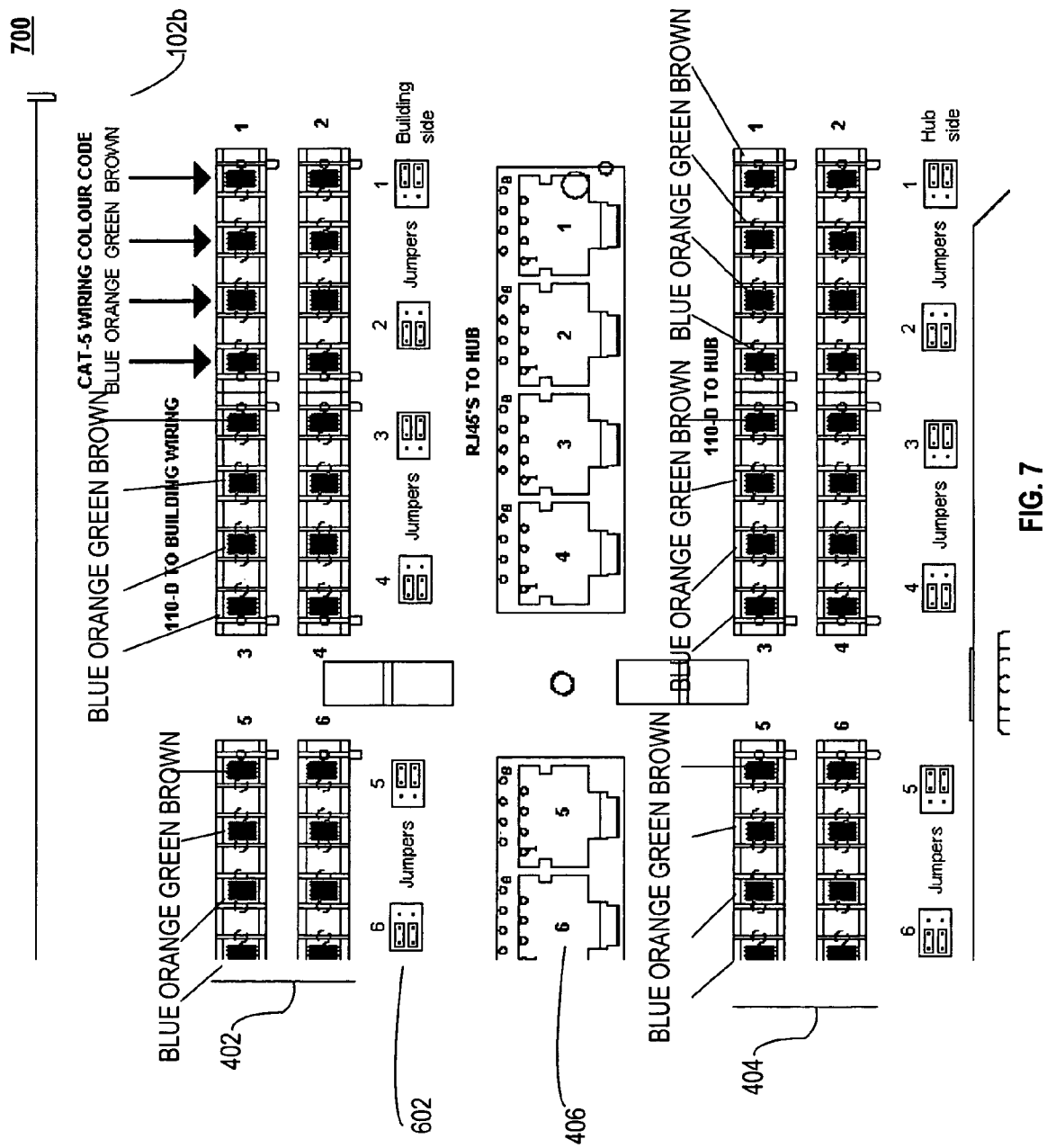
FIG. 7 depicts an exemplary embodiment of a diagram illustrating a more detailed view of a right side of the rear view of the patch panel depicted in FIGS. 4 and 6, including color coding of CAT-5 wiring for, connectors as described with reference to FIG. 4, and jumpers as described with reference to FIG. 6, according to an exemplary embodiment of the present invention.

FIG. 7 depicts an exemplary embodiment of a diagram 700 illustrating a more detailed view of an exemplary right side of the exemplary rear view of the exemplary patch panel depicted in FIGS. 4 and 6. In an exemplary embodiment, diagram 700 may include color coding of the IDC 110-D connector segments for CAT-5 wiring including blue, orange, green, and brown, in an exemplary embodiment, for the IDC connectors 402 as described with reference to FIG. 4. Also shown in diagram 700, are jumpers 602 for the building side, and hub side jumpers 604 (not labeled) as described with reference to FIG. 6, according to an exemplary embodiment of the present invention.

Referring to FIGS. 2-7, the through connections provided by the patch panel 102 between the top row of RJ-45 plugs 202 and the bottom row 204, may result in the PCs 108 being connected to the hub or media access unit (MAU) 104. In the event of a PC 108 user moving or a hub 104 port failing, it may be necessary to connect the hub 104 port to a different cable of the building wiring, as illustrated in FIG. 2. This may be achieved by placing a patch cord 112 between the socket associated with the new building wire termination and the hub connection 114. Inserting a patch cord 112 into any RJ-45 socket on the patch panel may result in the through connection being automatically broken. This through connection may be broken using relays 902, as illustrated below with reference to FIG. 9. These relays 902 may be latched so that in the event of a supply failure, the patch 102 may continue to operate as long as no patch changes are made while power is absent. A green LED power indicator 302 of FIG. 3, on the top left of the patch panel 102, between channels 4 and 5, may indicate if power is present. If the POE option is included on the patch 102 and active, a second green LED 308 may be in the lower row of LEDs, between channels 4 and 5, may also be illuminated, in an exemplary embodiment.

FIG. 3, shows the various items located on the front panel 102a of the Cat-5 patch panel 102 according to an exemplary embodiment. FIG. 4, shows the items which may be located on the rear of the panel and includes exemplary numbering of the 100-D 402, 404 and RJ45 connectors 406. FIG. 6, shows the left hand side view 600 of the rear panel indicating the location of the channel jumpers for channels 17 through 24, 602, 604a, 604b. In an exemplary embodiment, the location of the hub side jumpers for channels 21 through 24 are labeled as 604a. FIG. 6 also indicates an exemplary location of an exemplary POE connector 606 for the optional POE controller. FIG. 7 shows a detailed view of right side rear view 700, indicating exemplary color codes on the 110-Ds 402, 404 and locations of the jumpers 602.

Figure 8:
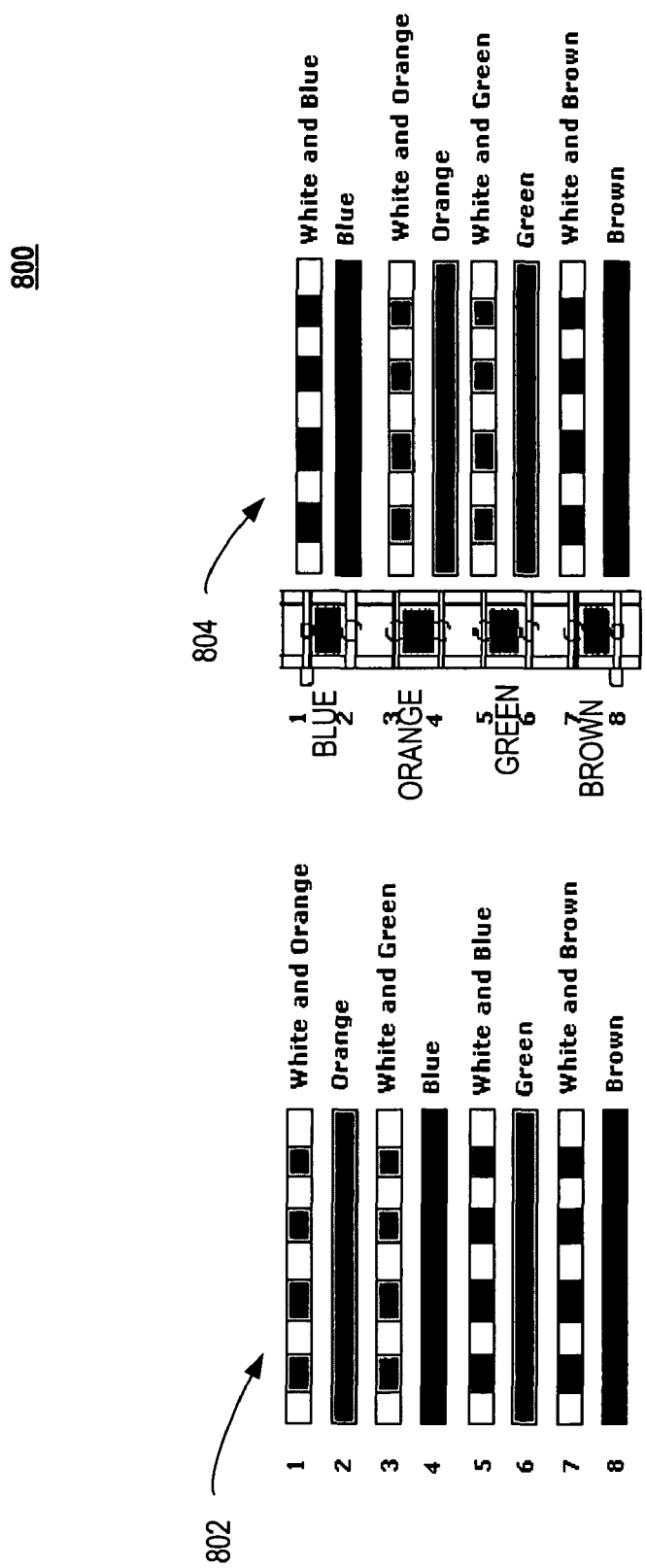
FIG. 8 depicts an exemplary embodiment of a diagram illustrating an exemplary RJ-45 plug TIA/EIA 568B wiring diagram, and a diagram illustrating an exemplary IDC 110-D TIA/EIA 568B wiring diagram, according to an exemplary embodiment of the present invention.

FIG. 8 depicts an exemplary embodiment of a diagram 80 including left side diagram 802 illustrating an exemplary RJ-45 plug TIA/EIA 568B wiring diagram, and a right side diagram 804 illustrating an exemplary IDC 110-D TIA/EIA 568B wiring diagram, according to an exemplary embodiment of the present invention.

FIG. 8 shows two exemplary diagrams for wiring color coding, in accordance with TIA/EIA 568B, that may be used by RJ45 (on the left) and IDC 110-D connectors (on the right) associated with installation of an exemplary Cat-5 patch panel 102 according to an exemplary embodiment.

Power Supply

In an exemplary embodiment, the Cat-5 Patch 102 may include a 5V DC power-supply. In one exemplary embodiment, an integral mains-socket and power supply unit (PSU) may be included with the panel. Exemplary embodiments may include North American 110 VAC, 13A, and/or UK versions or 2 pin continental types, according to an exemplary embodiment. The 5V may be applied to the Patch 102 via a DC jack socket, in an exemplary embodiment. The plus 5V may be applied at the tip, the ring may be common ground. The supply may power the activity and trace LEDs and may also power the relays which may be used to break the through connections. The peak power required may be approximately 3 watts, although the duty cycle may be very low as the relays may be only powered for about 200 mS once every ten seconds, in an exemplary embodiment. A lever block connector may be provided which may be used to interconnect the ground connections when several patch panels may be located together. Without this common connection, the patch trace may not operate between panels. Each panel in a multiple installation can be supplied with its own power supply, or may be daisy chained with up to 5 others, using the master panel power supply, according to an exemplary embodiment. A second DC jack socket may be provided to effect this chain. In the case of panels provided with the POE option, a power supply proving 48 VDC from 115-240 VAC may be provided, in an exemplary embodiment. The 48 VDC supply may provide both the necessary voltages for the POE option and the 5 VDC for the panel. The customer may also select to provide 48 VDC directly to the unit, in an exemplary embodiment.

Figure 9:
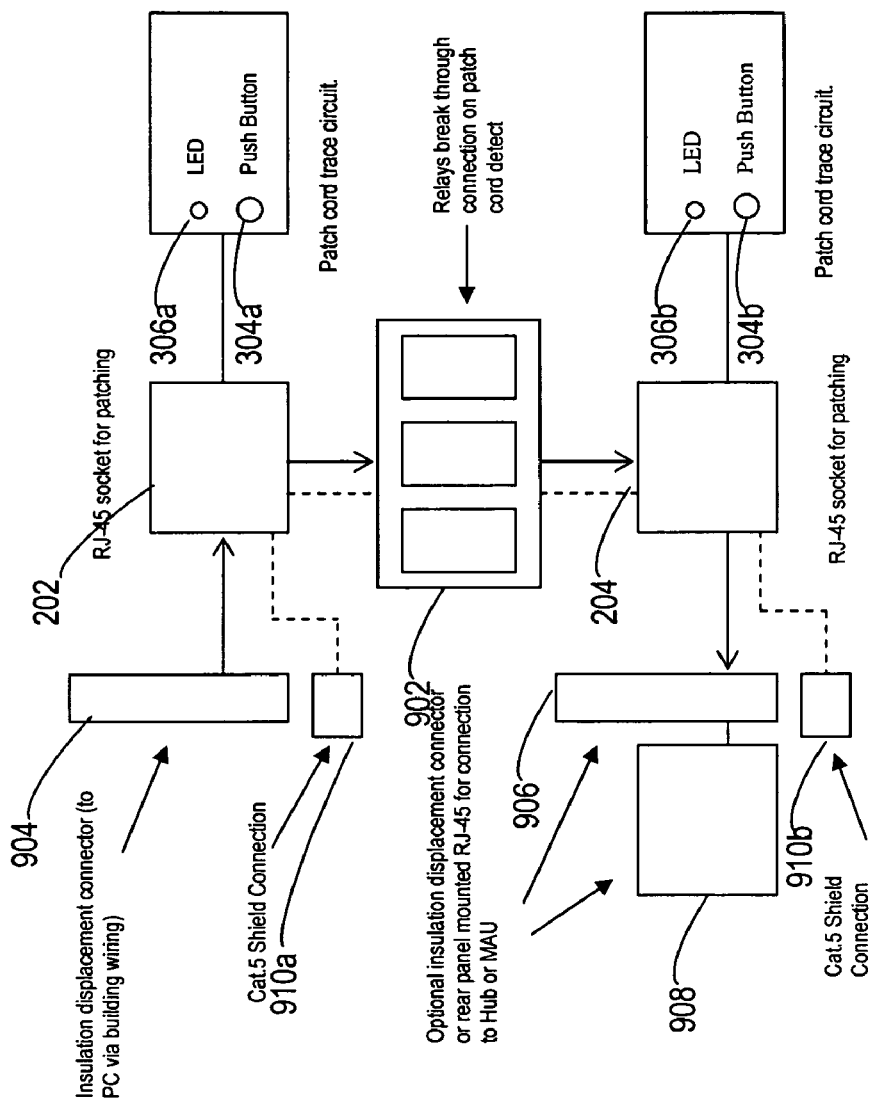
FIG. 9 depicts an exemplary embodiment of a diagram illustrating a single channel showing exemplary functions of the circuitry according to an exemplary embodiment of the present invention.

FIG. 9 depicts an exemplary embodiment of a diagram 900 illustrating a single channel showing exemplary functions of the circuitry according to an exemplary embodiment of the present invention. Diagram 900 may include, in an exemplary embodiment, relays 902, which may break through connection upon detection of a patch cord. As shown in an exemplary embodiment, diagram 900 may include an insulation displacement connector 904 which as shown may be coupled to a PC or other computing device via, e.g., building wiring. As shown in an exemplary embodiment, diagram 900 may include RJ-45 type connectors 202, 204, which may be used for patching via a patch cord (not shown). As shown in an exemplary embodiment, diagram 900 may include optional insulation displacement connectors or rear panel mounted RJ-45 for connection to hub or MAU 906, 908. As shown in an exemplary embodiment, diagram 900 may include category 5 (Cat.5) shielded connections 910*a*, 910*b*. As shown in an exemplary embodiment, diagram 900 may include, a patch cord trace circuit including, e.g., but not limited to, push buttons 304*a*, 304*b*, and patch indicators LEDs 306*a*, 306*b*, respectively, for either end of a patch. See FIG. 13 below for further details of an exemplary embodiment of patchcord circuitry.

Figure 13:
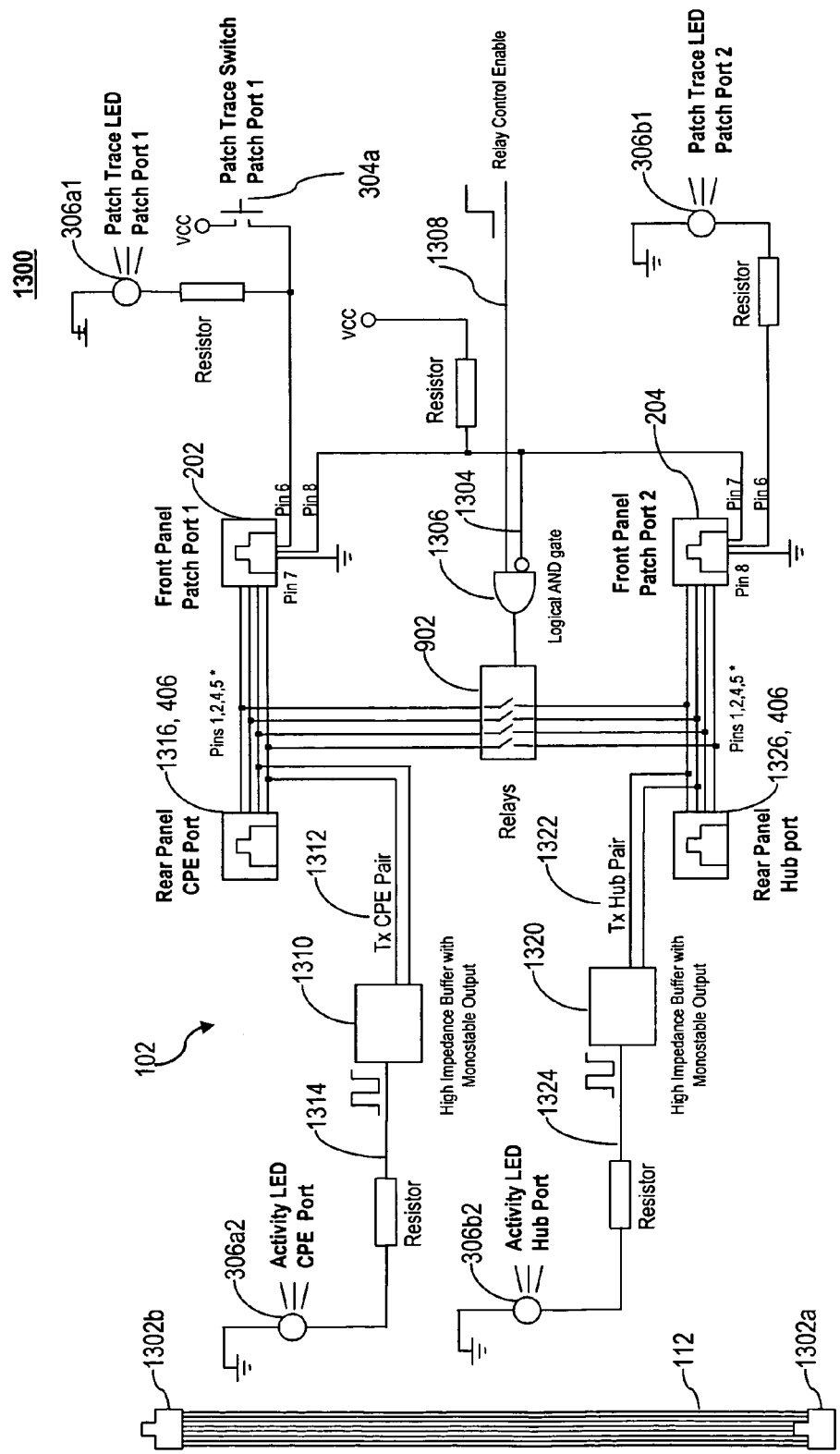
FIG. 13 depicts an exemplary embodiment of circuitry for an exemplary patch panel according to the present invention.

FIG. 13 depicts, in an exemplary embodiment, a diagram 1300 showing an exemplary circuit diagram for the patch panel 102 according to the present invention.

The exemplary 8-wire patch cord 112 depicted on the left on the diagram 1300 shows a patch cord 112, which may be used with the patch panel 102, which has an exemplary RJ45 connector 1302*a*, 1302*b* at each end. The 8 wires connect pins 1 through 8 on the first RJ45 connector 1302*a* at one end to pins 1 through 8 on the second RJ45 connector 1302*b* at the other end of the patch cord 112.

The typical patch cord 112, according to an exemplary embodiment, may be plugged into a front panel patch port 1 1202 and a front panel patch port 2 204 as shown in the right hand side of the diagram 1300 to create a patch connection. (Note that patch port 1 202 may be connected or coupled to a different patch port 2 204 than two ports connected through relays 902). Insertion of the patch cord 112 may couple or connect the numbered pins of patch port 1 202 directly, in an exemplary embodiment, to the same numbered pins on patch port 2 204. In the example shown in diagram 1300 the connection of pin 8 of patch port 1 202 to pin 7 of patch port 2 204 cause the input 1304 of the logical AND gate 1306 to be pulled from logical High to logical Low, in an exemplary embodiment, causing the relays 902 to switch state if the control line 1308 is high.

When a patch cord 112 is inserted into a front panel patch port 1 202 at one end and a front panel patch port 2 204 at the other end, pins 6 of patch ports 1 202, 2 204 may be coupled together and depressing the patch trace switch 304*a* will cause the Patch trace LED 306*a*, 306*b* at both ends of the patch cord 112 to light.

The two high impedance buffer circuits 1310, 1320 monitor the two transmit signal pairs 1312, 1322, of the CPE and Hub ports 1316, 1326, respectively, such that their respective activity LEDs may light when there are data transitions present on these wires. Monostable outputs 1314, 1324 may hold the LEDs 306*a*2, 306*b*2 on for a predetermined period so that even a very short data burst may cause the LEDs 306*a*2, 306*b*2 to light for a period that is visible to an observer.

Patch Cord Tracing

Each RJ-45 socket 202, 204 on the patch panel 102 has an associated LED 306*a*, 306*b* and push button switch 304*a*, 304*b*. Conventionally, when a large patch panel 102 gets overcrowded with patch cords 112 it gets very difficult to follow the patch cords 112 from their source to destination. With the Cat-5 Patch 102 according to an exemplary embodiment of the invention, if a user presses the push button 304*a* associated with an RJ-45 socket 202 at one end of the patch cord an LED 306*b* associated with the RJ-45 socket 304*b* at the other end of the patch cord 114 will illuminate. This makes it very easy to trace the patch cord 112 from its source to its destination. This facility will work between patch panels 102, according to an exemplary embodiment, provided that the common ground connection shown in FIG. 10, is made.

Figure 10:
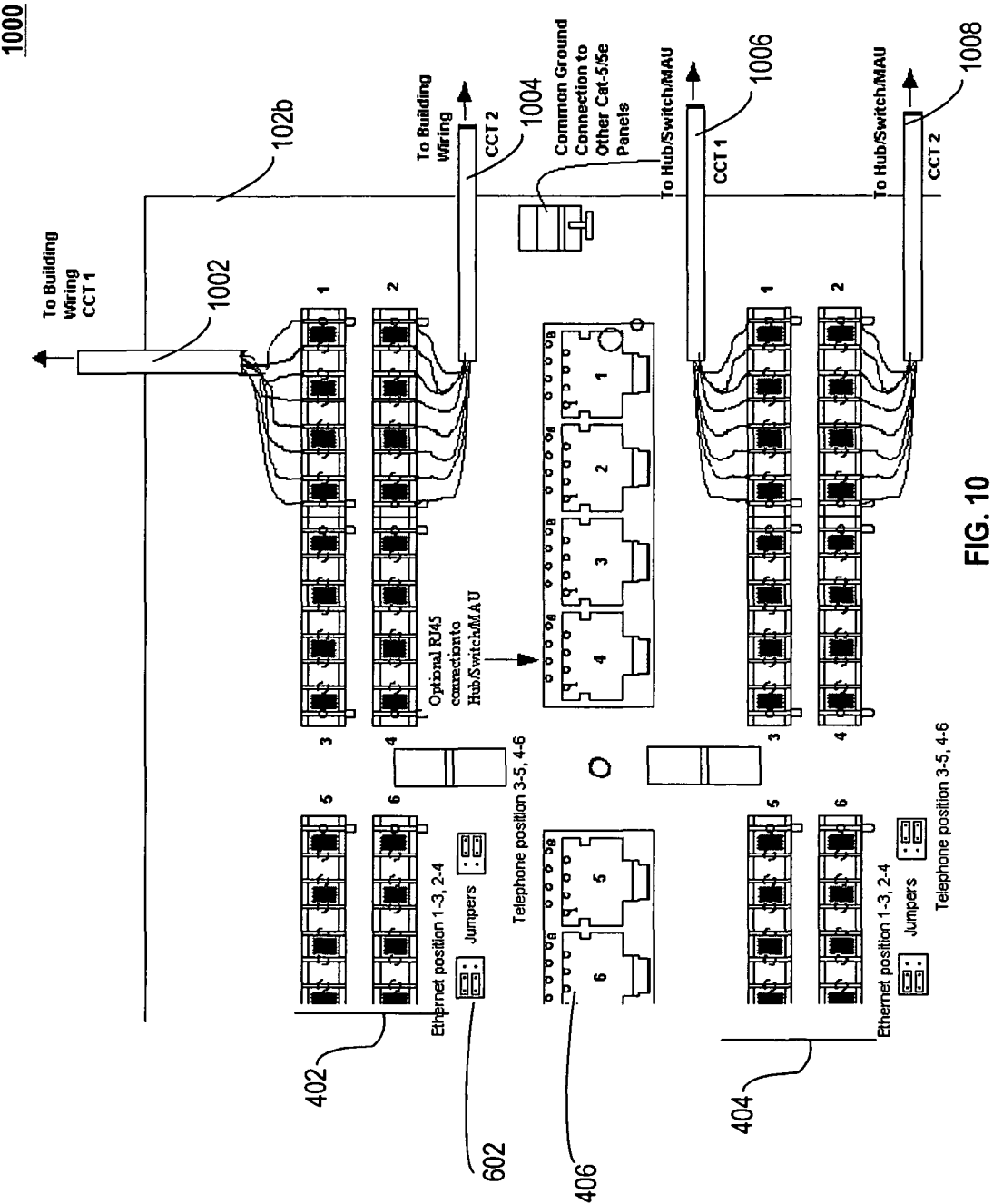
FIG. 10 depicts an exemplary embodiment of a diagram illustrating connections to a CAT-5 Patch, according to an exemplary embodiment of the present invention.

FIG. 10 depicts an exemplary embodiment of a diagram 1000 illustrating connections to a CAT-5 Patch, according to an exemplary embodiment of the present invention, including, in an exemplary embodiment, a common ground connection which may be coupled to other patch panels 102. As shown in an exemplary embodiment, diagram 900 may include building wiring 1002 for a circuit CCT1, coupled to IDC 402, and wiring 1004 for a circuit CCT2. As shown in an exemplary embodiment, diagram 900 may include a coupling to customer premises equipment (e.g., but not limited to, a hub, switch, personal branch exchange (PBX), multistation access unit (MAU), etc.) including wiring 1006 for a circuit CCT1, coupled to IDC 404, and wiring 1008 for a circuit CCT2.

Installing the Cat-5 Patch Panel

Installation and Wiring

The patch panel 102, according to an exemplary embodiment, may be used in an environment that may be set up in accordance with the standard TIA/EIA 568B. (See FIG. 8 for wiring details of the RJ-45s and 10-Ds). If this standard has not been followed, then wiring details may vary.

Before connecting any cables, the Ethernet selection links should be set, according to an exemplary embodiment. According to an exemplary embodiment, for Ethernet applications the links should short pins 1 to 3, and 2 to 4 and for Telephone, the link should short pins 3 to 5 and 4 to 6. The Cat-5 Patch panel 102 may be shipped in the default setting, for Ethernet unless otherwise requested or pre-arranged.

Connections to the 110-D insulation displacement connectors (IDCs) on the patch panel can be made using a tool which may be provided with the Cat-5 Patch panel 102, in one exemplary embodiment. The outer sheath of the wire may be stripped back about 1 inch and the wires may be placed over the correct slot on the insulation displacement connector (IDC) and may be pressed down with the tool. The action of pressing the wire into the connector may strip the insulation on the wire and make the connection. It is recommended that one ensure that the correct colored wire matches the correct slot on the connectors. Pin one of the building connections may go to pin one of the IDC etc. The Cat-5 wires may be installed into the 110-D connectors, in accordance with the drawing in FIG. 8, to conform to the wiring standard TIA/EIA-568B.

The Cat-5 Patch 102, in an exemplary embodiment, may be available with RJ45 connectors on the rear panel so that connections to a HUB, Ethernet Switch or MAU can be made using simple straight through RJ-45 to RJ-45 cables.

The chassis of the patch 102 may be equipped with cable guides/retainers, in an exemplary embodiment. The cables, in an exemplary embodiment, can be clamped to the cable guides/retainers using standard Zip Ties or tie wraps, to provide strain relief.

Although connection for 8 wires may be provided for convenience on the IDC connectors, the Cat-5 Patch 102 may only connect 4 wires and shield on the through connection. In an exemplary embodiment, when the Ethernet selector links are in the Ethernet position, pins 1, 2, 3 and 6 of the RJ45 connectors may be used and when in Telephone position pins 4 and 5 (center pair) of the RJ-45, may be connected through. In the 110-D connectors this may be the first or blue pair.

If the POE (Power Over Ethernet) option has been installed, in an exemplary embodiment, then the outside pairs of the building wiring side of the 110-D connectors (blue and brown pairs) may provide the POE voltages, provided the terminal equipment indicates that it is ready to accept POE voltages and the port has been enabled by the channels POE enable switch and/or software control. If none of the above conditions are met, then the POE controller may not apply the POE voltages.

Operation of the Cat-5 Patch
Activity LEDs

Each channel may have a bicolor LED 306*a*, 306*b* in an exemplary embodiment. The green LED when illuminated, may indicate that a device is connected and powered up. The top LED may indicate that the device connected via the building wiring may be active. The lower LED, may indicate that the HUB, switch or MAU port is active, in an exemplary embodiment.

Patching to Spare or Alternative Circuits

To patch a circuit using the Cat-5 Patch 102, according to an exemplary embodiment, a standard 8-wire RJ-45 Patch Cord 112 may be inserted into the appropriate sockets in the front of the patch panel 102. Once the patch cord 112 may have been inserted, the Cat-5 Patch 102 may detect the patch cord 112 and, in an exemplary embodiment, after a few seconds may disconnect the normal through connections, according to an exemplary embodiment. No patch cord may be necessary for straight through connections in the normally through connected version, according to an exemplary embodiment. In the pure patch version, according to an exemplary embodiment, a patch cord may be required for each connection required, regardless of the connection. In this case, since there may be no disconnection of the through connection, the patch may be effected immediately, in an exemplary embodiment.

Tracing Patch Cords on Crowded Patch Panels

If a patch panel 102 gets crowded with patch cords 112, following the patch cords 112 during maintenance can conventionally become a challenge. To trace the destination of a patch cord 112, according to an exemplary embodiment, one may press the patch trace button 304*a*, 304*b* associated with the RJ-45 connector at one end of a patch cord, and the amber portion of the bicolor LED 306*a*, 306*b* may illuminate at the RJ-45 at the other end of the patch cord 112. The amber LED 306*a*, 306*b* adjacent to the button pressed may also illuminate. This can also be used as a test for the LEDs. This trace feature may work in both directions, according to an exemplary embodiment. A patch trace button 304 and LED 306 may be provided for all the RJ-45 connectors at both the line and equipment ends of the patch cord 112, according to an exemplary embodiment.

Jumpers for Ethernet or Telephone Use

Each channel may have two sets of 6 pin headers, located in vicinity of the rear 110-D connectors, according to an exemplary embodiment. In all but four of channels, according to an exemplary embodiment, these may be arranged logically across the unit right to left. J3 and J4 for channel 1, J9 and J10 for channel 2 etc. The upper jumpers 602 may change the Building side, the lower jumpers 604 may change the Hub/Switch side, in an exemplary embodiment. FIG. 6 indicates the location of the jumpers for channels 21 through 24 in an exemplary embodiment.

In an exemplary embodiment, jumpers may be used to switch between data and voice operation for an associated connector. The default setting may be all jumpers to the left position, (pins 1-3 and 2-4), for Ethernet operation. To configure the unit for Telephone use of the central pair in the RJ-45 connectors (Blue-Blue/white pair), the jumpers may be placed in the right position, (pins 3-5 and 4-6), in an exemplary embodiment.

Power Considerations

When power is cut off to the patch panel 102, the patch trace may not work, in one exemplary embodiment. Although the relays 902 may be latching to preserve connections during power cuts, through connections can not be made or broken, in an exemplary embodiment. Patch cords 112 should therefore not be inserted or removed during power outages, in an exemplary embodiment. If a patch cord is removed or inserted, while power is not being provided, the through connection may be adjusted accordingly within a few seconds of power being restored, in an exemplary embodiment. In the pure patch version, since the patch cord may be the "connection", there may be no concerns about power and connectivity. In this situation, power may be only required for the activity and patch trace indication functions.

General

The Cat-5 Patch panel 102 may be used in Ethernet and Telephone environments. It may also be used, in an exemplary embodiment, in any 4-wire system based on, e.g., but not limited to, twisted pair, shielded and/or unshielded, provided the designated pairs 1, 2, 3 & 6, when set for Ethernet, are used.

Approximate performance figures of an exemplary embodiment of the Cat-5 Patch panel 102 may be as follows:
Insertion Loss may be 0.2 dB's at 100 Mhz.
Isolation 40 dB's at 100 Mhz.
VSWR approximately 1.1 at 100 Mhz for twisted pair cables.

An Exemplary Computer System

FIG. 5 depicts an exemplary embodiment of a computer system that may be used in computing devices such as, e.g., but not limited to, client or server devices according to an exemplary embodiment of the present invention. FIG. 5 depicts an exemplary embodiment of a computer system that may be used as client device 108, or a server device (not shown), etc. The present invention (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 500 is shown in FIG. 5, depicting an exemplary embodiment of a block diagram of an exemplary computer system useful for implementing the present invention. Specifically, FIG. 5 illustrates an example computer 500, which in an exemplary embodiment may be, e.g., (but not limited to) a personal computer (PC) system running an operating system such as, e.g., (but not limited to) WINDOWS MOBILE™ for POCKET PC, or MICROSOFT® WINDOWS® NT/98/2000/XP/CE/, etc. available from MICROSOFT® Corporation of Redmond, Wash., U.S.A., SOLARIS® from SUN® Microsystems of Santa Clara, Calif., U.S.A., OS/2 from IBM® Corporation of Armonk, N.Y., U.S.A., Mac/OS from APPLE® Corporation of Cupertino, Calif., U.S.A., etc., or any of various versions of UNIX® (a trademark of the Open Group of San Francisco, Calif., USA) including, e.g., LINUX®, HPUX®, IBM AIX®, and SCO/UNIX®, etc. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 500 is shown in FIG. 5. Other components of the invention, such as, e.g., (but not limited to) a computing device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers, etc., may also be implemented using a computer such as that shown in FIG. 5.

The computer system 500 may include one or more processors, such as, e.g., but not limited to, processor(s) 504. The processor(s) 504 may be connected to a communication infrastructure 506 (e.g., but not limited to, a communications bus, cross-over bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 500 may include a display interface 502 that may forward, e.g., but not limited to, graphics, text, and other data, etc., from the communication infrastructure 506 (or from a frame buffer, etc., not shown) for display on the display unit 530.

The computer system 500 may also include, e.g., but may not be limited to, a main memory 508, random access memory (RAM), and a secondary memory 510, etc. The secondary memory 510 may include, for example, (but not limited to) a hard disk drive 512 and/or a removable storage drive 514, representing a floppy diskette drive, a magnetic tape drive, an optical disk drive, a compact disk drive CD-ROM, etc. The removable storage drive 514 may, e.g., but not limited to, read from and/or write to a removable storage unit 518 in a well known manner. Removable storage unit 518, also called a program storage device or a computer program product, may represent, e.g., but not limited to, a floppy disk, magnetic tape, optical disk, compact disk, etc. which may be read from and written to by removable storage drive 514. As will be appreciated, the removable storage unit 518 may include a computer usable storage medium having stored therein computer software and/or data.

In alternative exemplary embodiments, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 522 and interfaces 520, which may allow software and data to be transferred from the removable storage unit 522 to computer system 500.

Computer 500 may also include an input device such as, e.g., (but not limited to) a mouse or other pointing device such as a digitizer, and a keyboard or other data entry device (none of which are labeled).

Computer 500 may also include output devices, such as, e.g., (but not limited to) display 530, and display interface 502. Computer 500 may include input/output (I/O) devices such as, e.g., (but not limited to) communications interface 524, cable 528 and communications path 526, etc. These devices may include, e.g., but not limited to, a network interface card, and modems (neither are labeled). Communications interface 524 may allow software and data to be transferred between computer system 500 and external devices. Examples of communications interface 524 may include, e.g., but may not be limited to, a modem, a network interface (such as, e.g., an Ethernet card), a communications port, a Personal Computer Memory Card International Association (PCMCIA) slot and card, etc. Software and data transferred via communications interface 524 may be in the form of signals 528 which may be electronic, electromagnetic, optical or other signals capable of being received by communications interface 524. These signals 528 may be provided to communications interface 524 via, e.g., but not limited to, a communications path 526 (e.g., but not limited to a channel). This channel 526 may carry signals 528, which may include, e.g., but not limited to, propagated signals, and may be implemented using, e.g., but not limited to, wire or cable, fiber optics, a telephone line, a cellular link, an radio frequency (RF) link and other communications channels, etc.

In this document, the terms "computer program medium" and "computer readable medium" may be used to generally refer to media such as, e.g., but not limited to removable storage drive 514, a hard disk installed in hard disk drive 512, and signals 528, etc. These computer program products may provide software to computer system 500. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; or and others.

Computer programs (also called computer control logic), may include object oriented computer programs, and may be stored in main memory 508 and/or the secondary memory 510 and/or removable storage units 514, also called computer program products. Such computer programs, when executed, may enable the computer system 500 to perform the features of the present invention as discussed herein. In particular, the computer programs, when executed, may enable the processor 504 to provide a method to resolve conflicts during data synchronization according to an exemplary embodiment of the present invention. Accordingly, such computer programs may represent controllers of the computer system 500.

In another exemplary embodiment, the invention may be directed to a computer program product comprising a computer readable medium having control logic (computer software) stored therein. The control logic, when executed by the processor 504, may cause the processor 504 to perform the functions of the invention as described herein. In another exemplary embodiment where the invention may be implemented using software, the software may be stored in a computer program product and loaded into computer system 500 using, e.g., but not limited to, removable storage drive 514, hard drive 512 or communications interface 524, etc. The control logic (software), when executed by the processor 504, may cause the processor 504 to perform the functions of the invention as described herein. The computer software may run as a standalone software application program running atop an operating system, or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

Exemplary embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The exemplary embodiment of the present invention makes reference to wired, or wireless networks. Wired networks include any of a wide variety of well known means for coupling voice and data communications devices together. A brief discussion of various exemplary wireless network technologies that may be used to implement the embodiments of the present invention now are discussed. The examples are non-limited. Exemplary wireless network types may include, e.g., but not limited to, code division multiple access (CDMA), spread spectrum wireless, orthogonal frequency division multiplexing (OFDM), 1G, 2G, 3G wireless, Bluetooth, Infrared Data Association (IrDA), shared wireless access protocol (SWAP), "wireless fidelity" (Wi-Fi), WIMAX, and other IEEE standard 802.11-compliant wireless local area network (LAN), 802.16-compliant wide area network (WAN), and ultrawideband (UWB), etc.

Bluetooth is an emerging wireless technology promising to unify several wireless technologies for use in low power radio frequency (RF) networks.

IrDA is a standard method for devices to communicate using infrared light pulses, as promulgated by the Infrared Data Association from which the standard gets its name. Since IrDA devices use infrared light, they may depend on being in line of sight with each other.

The exemplary embodiments of the present invention may make reference to WLANs. Examples of a WLAN may include a shared wireless access protocol (SWAP) developed by Home radio frequency (HomeRF), and wireless fidelity (Wi-Fi), a derivative of IEEE 802.11, advocated by the wireless ethernet compatibility alliance (WECA). The IEEE 802.11 wireless LAN standard refers to various technologies that adhere to one or more of various wireless LAN standards. An IEEE 802.11 compliant wireless LAN may comply with any of one or more of the various IEEE 802.11 wireless LAN standards including, e.g., but not limited to, wireless LANs compliant with IEEE std. 802.11a, b, d or g, such as, e.g., but not limited to, IEEE std. 802.11a, b, d and g, (including, e.g., but not limited to IEEE 802.11g-2003, etc.), etc.

Exemplary Communications Network Environment and Alternate Exemplary Embodiments of the Present Invention In an exemplary embodiment, the patch panel may be used as part of a voice or data communications network as described below with reference to FIGS. 11 and 12. The exemplary patch panel as described in the exemplary embodiment includes several exemplary, but non-limited specific types of electrical sockets and connectors. However, alternate exemplary embodiments may also include other types of electrical connectors, and other connectors, including, e.g., but not limited to, optical fiber connectors, IBM cabling system connectors, etc.

Although the invention is described in terms of this example environment, it is important to note that description in these terms is provided for purposes of illustration only. It is not intended that the invention be limited to this example environment or to the precise inter-operations between the above-noted entities and devices. In fact, after reading the following description, it will become apparent to a person skilled in the relevant art how to implement the invention in alternative environments.

DEFINITIONS

Table 1 below defines common telecommunications terminology. These terms may be used throughout the remainder of the description of the invention.

TABLE 1

| Term | Definition |
| --- | --- |
| automatic number identification (ANI) | A telephone service that transmits the billing number (BN) and the telephone number of the incoming call. ANI identifies the calling party for toll call billing and enables the call to be routed to the appropriate long distance service provider. ISDN supports ANI by carrying the calling telephone number in the D channel. ACD systems use the billing number to query a database and retrieve the customer's records. |
| access tandem (AT) | An AT is a class ¾ switch may be used to switch calls between EOs in a LATA. An AT may provide subscribers access to the IXCs, to provide long distance calling services. An access tandem may be a network node. Other network nodes may include, for example, but not limited to, a CLEC, or other enhanced services provider (ESP), an international gateway or global point-of-presence (GPOP), or an intelligent peripheral(IP). |
| bearer (B) channels | Bearer (B) channels are digital channels may be used to carry both digital voice and digital data information. An ISDN bearer channel is 64,000 bits per second, which can |

TABLE 1-continued

| Term | Definition |
| --- | --- |
| | carry PCM-digitized voice or data. |
| called party | The called party is the caller receiving a call sent over a network at the destination or termination end. |
| calling party | The calling party is the caller placing a call over any kind of network from the origination end. |
| central office (CO) | A CO is a facility that houses an EO homed. EOs are often called COs. |
| class 1 switch | A class 1 switching office, the Regional Center(RC), is the highest level of local and long distance switching, or "office of last resort" to complete a call. |
| class 3 switch | A class 3 switching office is a Primary Center (PC); an access tandem (AT) has class 3 functionality. |
| class 4 switch | A class 4 switching office is a Toll Center (TC) if operators is present or else a Toll Point (TP); an access tandem (AT) has class 4 functionality. |
| class 5 switch | A class 5 switching office is an end office (EO) or the lowest level of local and long distance switching, a local central office. The switch closest to the end subscriber. |
| competitive LEC (CLEC) | CLECs are telecommunications services providers of local services that can compete with ILECs. A CLEC may or may not handle IXC services as well. |
| competitive access providers (CAPS) | CAPs are competitive access providers. |
| customer premises equipment (CPE) | CPE refers to devices residing on the remises of a customer and used to connect to a telephone network, including ordinary telephones, key telephone systems, PBXs, video conferencing devices and modems. |
| digitized data (or digital data) | Digitized data refers to analog data that has been sampled into a binary representation (i.e., comprising sequences of 0's and 1's). Digitized data is less susceptible to noise and attenuation distortions because it is more easily regenerated to reconstruct the original signal. |
| egress end office | The egress EO is the node or destination EO with a direct connection to the called party, the termination point. The called party is "homed" to the egress EO. |
| egress | Egress refers to the connection from a called party or termination at the destination end of a network, to the serving wire center (SWC). |
| end office (EO) | An EO is a class 5 switch used to switch local calls within a LATA. Subscribers of the LEC are connected ("homed") to EOs, meaning that EOs are the last switches to which the subscribers are connected. |
| Enhanced Service Provider (ESP) | A network services provider. |
| equal access | 1+ dialing as used in US domestic calling for access to any long distance carrier as required under the terms of the modified final judgment (MFJ) requiring divestiture of the Regional Bell Operating Companies (RBOCs) from their parent company, AT&T. |

TABLE 1-continued

| Term | Definition |
| --- | --- |
| global point of presence (GPOP) | A GPOP refers to the location where international telecommunications facilities and domestic facilities interface, an international gateway POP. |
| incumbent LEC (ILEC) | ILECs are traditional LECs in the US, which are the Regional Bell Operating Companies (RBOCs). Bell South and US West are examples. ILEC can also stand for an independent LEC such as a GTE. |
| ingress end office | The ingress EO is the node or serving wire center (SVC) with a direct connection to the calling party, the origination point. The calling party is "homed" to the ingress EO. |
| ingress | Ingress refers to the connection from a calling party or origination. |
| integrated service digital network (ISDN) basic rate interface (BRI) line | An ISDN Basic Rate Interface (BRI) line provides 2 bearer B channels and 1 data D line (known as "2B + D" over one or two pairs) to a subscriber. |
| integrated services digital network (ISDN) | ISDN is a network that provides a standard for communications (voice, data and signaling), end-to-end digital transmission circuits, out-of-band signaling, and a features significant amount of bandwidth. |
| inter machine trunk (IMT) | An inter-machine trunk (IMT) is a circuit between two commonly-connected switches. |
| inter-exchange carrier (IXC) | IXCs are US domestic long distance telecommunications services providers. AT&T, MCI, Sprint, are examples. |
| internet protocol (IP) | IP is part of the TCP/IP protocols. It is used to recognize incoming messages, route outgoing messages, and keep track of Internet node addresses (using a number to specify a TCP/IP host on the Internet). IP corresponds to the network layer of OSI. |
| Internet service provider (ISP) | An ISP is a company that provides Internet access to subscribers. |
| ISDN primary rate interface (PRI) | An ISDN Primary Rate Interface (PRI) line provides the ISDN equivalent of a T1 circuit. The PRI delivered to a customer's premises can provide 23B + D (in North America) or 30B + D (in Europe) channels running at 1.544 megabits per second and 2.048 megabits per second, respectively. |
| local exchange carrier (LEC) | LECs are local telecommunications services providers. Bell Atlantic and US West are examples. |
| local access and transport area (LATA) | A LATA is a region in which a LEC offers services. There are over 160 LATAs of these local geographical areas within the United States. |
| local area network (LAN) | A LAN is a communications network providing connections between computers and peripheral devices (e.g., printers and modems) over a relatively short distance (e.g., within a building) under standardized control. |
| modified final judgment (MFJ) | Modified final judgment (MEJ) was the decision requiring divestiture of the Regional Bell Operating Companies (RBOCs) from their parent company, AT&T. |
| network node | A network node is a generic term for the resources in a telecommunications network, including switches, DACS, regenerators, etc. Network nodes essentially include all non-circuit (transport) devices. Other network nodes can include, for example, equipment of a CLEC, or other enhanced service provider (ESP), a point-of-presence (POP), an international gateway or global point-of-presence (GPOP). |
| new entrant (NE) | A new generation global telecommunications. |
| next generation telephone (NGT) | A new telecommunications services provider, especially IP telephony providers. |
| packetized voice or voice over a backbone | One example of packetized voice is voice over internet protocol (VOIP). Voice over packet refers to the carrying of telephony or voice traffic over a data network, e.g. voice over frame, voice over ATM, voice over Internet Protocol (IP), over virtual private networks (VPNs), voice over a backbone, etc. |
| patch panel | A device used to organize wires and cables, allowing easy connection of premises wiring, to customer premises equipment (CPE). A patch panel may be used as a central point of wiring termination and may permit manual or semi-manual connection of equipment. Some patch panels may allow use of a patch cord to couple devices via alternate connections. |
| pipe or dedicated communications facility | A pipe or dedicated communications facility connects an ISP to the internet. |
| point of presence (POP) | A POP refers to the location within a LATA where the IXC and LEC facilities interface. |
| point-to-point tunneling protocol (PPTP) | A virtual private networking protocol, point-to-point tunneling protocol (PPTP), can be used to create a "tunnel" between a remote user and a data network. A tunnel permits a network administrator to extend a virtual private network (VPN) from a server (e.g., a Windows NT server) to a data network (e.g., the Internet). |
| point-to-point (PPP) protocol | PPP is a protocol permitting a computer to establish a connection with the Internet using a modem. PPP supports high-quality graphical front ends, like Netscape. |
| postal telephone telegraph (PTT) | State regulated telephone companies, many of which are being deregulated. NTT is an example. |
| private branch exchange (PBX) | A PBX is a private switch located on the premises of a user. The user is typically a private company which desires to provide switching locally. |
| private line with a dial tone | A private line is a direct channel specifically dedicated to a customer's use between two specified points. A private line with a dial tone can connect a PBX or an ISP's access concentrator to an end office (e.g. a channelized T1 or PRI). A private line can also be known as a leased line. |

TABLE 1-continued

| Term | Definition |
| --- | --- |
| public switched telephone network (PSTN) | The PSTN is the worldwide switched voice network. |
| regional Bell operating companies (RBOCs) | RBOCs are the Bell operating companies providing LEC services after being divested from AT&T. |
| signaling system 7 (SS7) | SS7 is a type of common channel interoffice signaling (CCIS) used widely throughout the world. The SS7 network provides the signaling functions of indicating the arrival of calls, transmitting routing and destination signals, and monitoring line and circuit status. |
| switching hierarchy or office classification | An office class is a functional ranking of a telephone central office switch depending on transmission requirements and hierarchical relationship to other switching centers. Prior to AT&T's divestiture of the RBOCs, an office classification was the number assigned to offices according to their hierarchical function in the U.S. public switched network (PSTN). The following class numbers are used: class 1 = Regional Center(RC), class 2 = Sectional Center (SC), class 3 = Primary Center (PC), class 4 = Toll Center (TC) if operators are present or else Toll Point (TP), class 5 = End Office (EO) a local central office. Any one center handles traffic from one to two or more centers lower in the hierarchy. Since divestiture and with more intelligent software in switching offices, these designations have become less firm. The class 5 switch was the closest to the end subscriber. Technology has distributed technology closer to the end user, diffusing traditional definitions of network switching hierarchies and the class of switches. |
| telecommunications carrier | A LEC, a CLEC, an IXC, an Enhanced Service Provider (ESP), an intelligent peripheral (IP), an international/global point-of-presence (GPOP), i.e., any provider of telecommunications services. |
| transmission control protocol (TCP) | TCP is an end-to-end protocol that operates at the transport and sessions layers of OSI, providing delivery of data bytes between processes running in host computers via separation and sequencing of IP packets. |
| transmission control protocol/internet protocol (TCP/IP) | TCP/IP is a protocol that provides communications between interconnected networks. The TCP/IP protocol is widely used on the Internet, which is a network comprising several large networks connected by high-speed connections. |
| trunk | A trunk connects an access tandem (AT) to an end office (EO). |
| wide area network (WAN) | A WAN is a data network that extends a LAN over the circuits of a telecommunications carrier. The carrier is typically a common carrier. A bridging switch or a router is used to connect the LAN to the WAN. |

Introduction

Exemplary Telecommunications Network-Voice Network-Simple Voice Network

Figure 11:
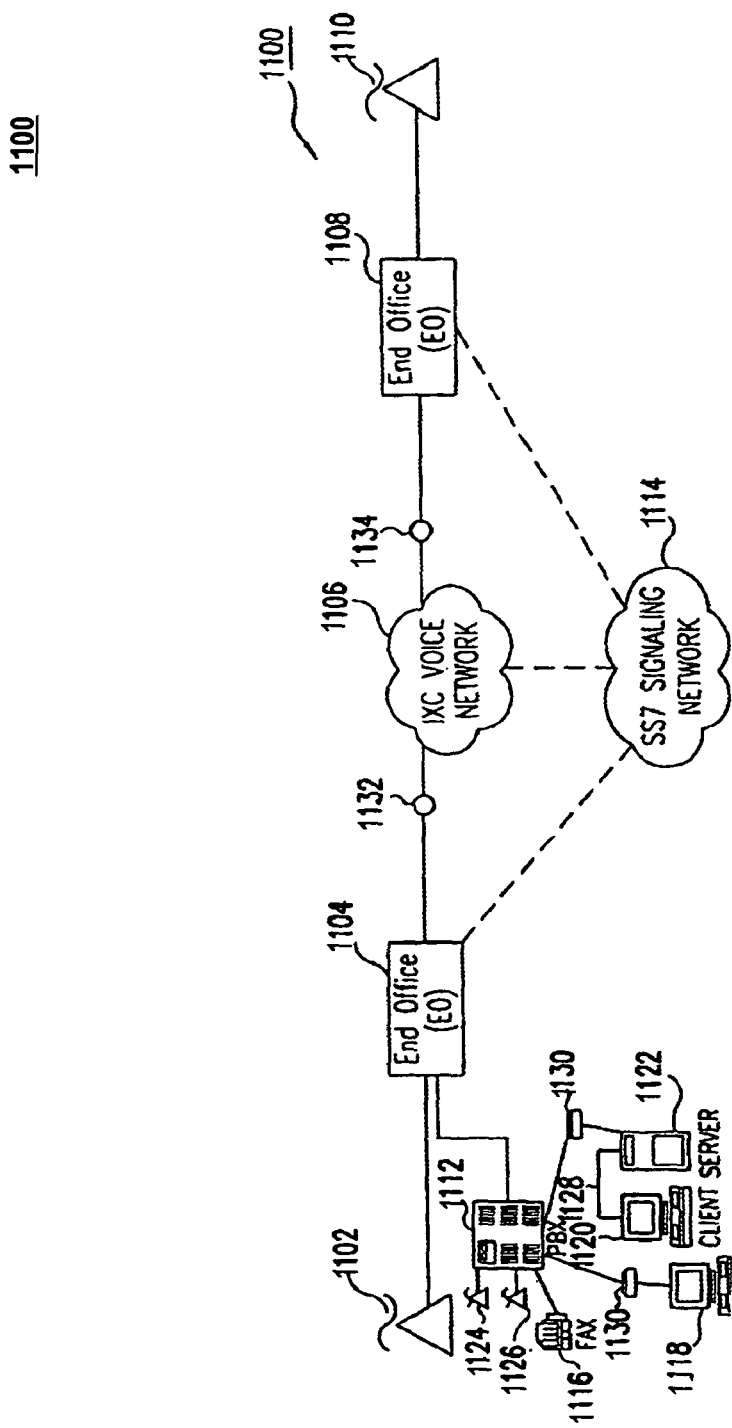
FIG. 11 depicts an exemplary voice network which may include the patch panel according to an exemplary embodiment.

FIG. 11 is a block diagram providing an overview of a standard telecommunications network 1100 providing local exchange carrier (LEC) services within one or more local access and transport areas (LATAs). Telecommunications network 1100 can provide a switched voice connection from a calling party 1102 to a called party 1110. FIG. 11 is shown to also include a private branch exchange 1112 which can provide multiple users access to LEC services by, e.g., a private line. Calling party 1102 and called party 1110 can be ordinary telephone equipment, key telephone systems, a private branch exchange (PBX) 1112, or applications running on a host computer. Network 1100 can be used for modem access as a data connection from calling party 1102 to, for example, an Internet service provider (ISP) (not shown). Network 1100 can also be used for access to, e.g., a private data network. For example, calling party 1102 can be an employee working on a notebook computer at a remote location who is accessing his employer's private data network through, for example, a dial-up modem connection.

FIG. 11 includes end offices (EOs) 1104 and 1108. EO 1104 is called an ingress EO because it provides a connection from calling party 1102 to public switched telephone network (PSTN) facilities. EO 1108 is called an egress EO because it provides a connection from the PSTN facilities to a called party 1110. In addition to ingress EO 1104 and egress EO 1108, the PSTN facilities associated with telecommunications network 1100 include an access tandem (AT) (not shown) at points of presence (POPs) 1132 and 1134 that can provide access to, e.g., one or more inter-exchange carriers (IXCs) 1106 for long distance traffic, see FIG. 12. Alternatively, it would be apparent to a person having ordinary skill in the art that IXC 1106 could also be, for example, a CLEC, or other enhanced service provider (ESP), an international gateway or global point-of-presence (GPOP), or an intelligent peripheral (IP).

FIG. 11 also includes a private branch exchange (PBX) 1112 coupled to EO 1104. PBX 1112 couples calling parties 1124 and 1126, fax 1116, client computer 1118 and associated modem 1130, and local area network 1128 having client computer 1120 and server computer 1122 coupled via an associated modem 1130. PBX 1112 is a specific example of a general class of telecommunications devices located at a subscriber site, commonly referred to as customer premises equipment (CPE).

Network 1100 also includes a common channel interactive signaling (CCIS) network for call setup and call tear down. Specifically, FIG. 11 includes a Signaling System 7 (SS7) signaling network 1114.

Detailed Voice Network

Figure 12:
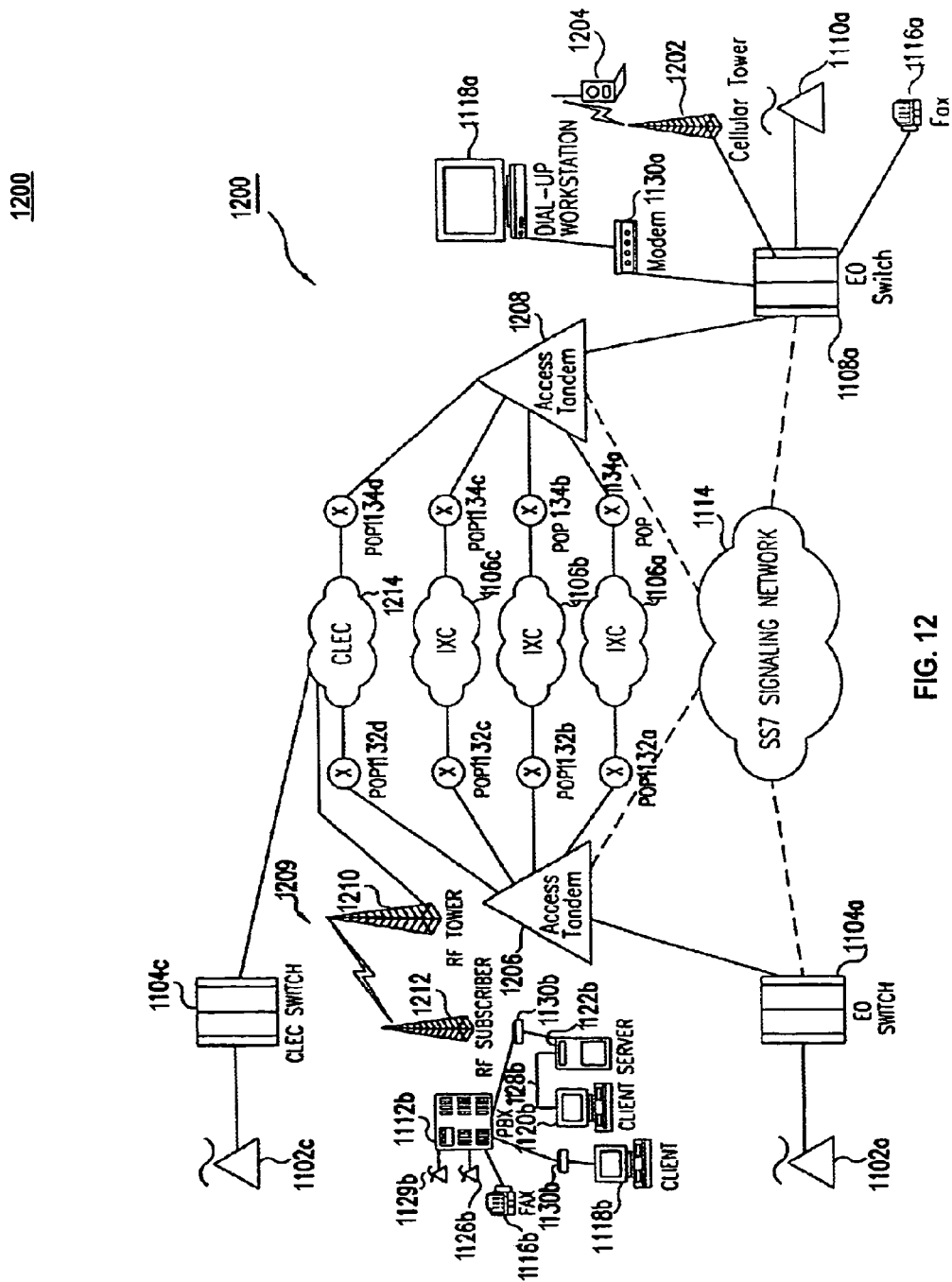
FIG. 12 depicts another exemplary network which may include the patch panel according to an exemplary embodiment.

FIG. 12 is a block diagram illustrating an overview of a standard telecommunications network 1200, providing both LEC and IXC carrier services between subscribers located in different LATAs. Telecommunications network 1200 is a more detailed version of telecommunications network 1100. Calling party 1102a and called party 1110a are coupled to EO switches 1104a and 1108a, respectively. In other words, calling party 1102a is homed to ingress EO 1104a in a first LATA, whereas called party 1110a is homed to an egress EO 1108a in a second LATA. Calls between subscribers in different LATAs are long distance calls that are typically routed to IXCs. Sample IXCs in the United States include AT&T, MCI and Sprint.

Telecommunications network 1200 includes access tandems (AT) 1206 and 1208. AT 1206 provides connection to points of presence (POPs) 1132*a*, 1132*b*, 1132*c* and 1132*d*. IXCs 1106*a*, 1106*b* and 1106*c* provide connection between POPs 1132*a*, 1132*b* and 1132*c* (in the first LATA) and POPs 1134*a*, 1134*b* and 1134*c* (in the second LATA). Competitive local exchange carrier (CLEC) 1214 provides an alternative connection between POP 1132*d* and POP 1134*d*. POPs 1134*a*, 1134*b*, 1134*c* and 1134*d*, in turn, are connected to AT 1208, which provides connection to egress EO 1108*a*. Called party 1110*a* can receive calls from EO 1108*a*, which is its homed EO.

Alternatively, it would be apparent to a person having ordinary skill in the art that an AT 1206 can also be, for example, a CLEC, or other enhanced service provider (ESP), an international gateway or global point-of-presence (GPOP), or an intelligent peripheral.

Network 1200 also includes calling party 1102*c* homed to CLEC switch 1104*c*. Following the 1996 Telecommunications Act in the U.S., CLECs gained permission to compete for access within the local RBOCs territory. RBOCs are commonly referred to as incumbent local exchange carriers (ILECs).

Network 1200 further may include a fixed wireless CLEC 1209. Fixed wireless CLEC 1209 includes a wireless transceiver/receiver radio frequency (RF) tower 1210 in communication over an RF link to a subscriber transciever RF tower 1212. Subscriber RF tower 1212 is depicted coupled to a CPE box, PBX 1112*b*. PBX 1112*b* couples calling parties 1124*b* and 1126*b*, fax 1116*b*, client computer 1118*b* and associated modem 1130*b*, and local area network 1128*b* having client computer 1120*b* and server computer 1122*b* coupled via an associated modem 1130*b*.

Network 1200 also includes called party 1110*a*, a fax 1116*a*, client computer 1118*a* and associated modem 1130*a*, and cellular communications RF tower 1202 and associated cellular subscriber called party 1204, all coupled to EO 108*a*, as shown.

EO 1104*a*, 1108*a* and AT 1206, 1208 are part of a switching hierarchy. EO 1104*a* is known as a class 5 office and AT 1208 is a class ¾ office switch. Prior to the divestiture of the regional Bell Operating Companies (RBOCs) from AT&T following the modified final judgment, an office classification was the number assigned to offices according to their hierarchical function in the U.S. public switched network (PSTN). An office class is a functional ranking of a telephone central office switch depending on transmission requirements and hierarchical relationship to other switching centers. A class 1 office was known as a Regional Center (RC), the highest level office, or the "office of last resort" to complete a call. A class 2 office was known as a Sectional Center (SC). A class 3 office was known as a Primary Center (PC). A class 4 office was known as either a Toll Center (TC) if operators were present, or otherwise as a Toll Point (TP). A class 5 office was an End Office (EO), i.e., a local central office, the lowest level for local and long distance switching, and was the closest to the end subscriber. Any one center handles traffic from one or more centers lower in the hierarchy. Since divestiture and with more intelligent software in switching offices, these designations have become less firm. Technology has distributed functionality closer to the end user, diffusing traditional definitions of network hierarchies and the class of switches.

Connectivity to Internet Service Providers (ISPs)

In addition to providing a voice connection from calling party 1102*a* to called party 1110*a*, the PSTN can provide calling party 1102*a* a data connection to an ISP (i.e. similar to client 1118*b*).

Network 1200 can also include an Internet service provider (ISP) (not shown) which could include a server computer 1122 coupled to a data network 1142 as will be discussed further below with reference to FIG. 3. The Internet is a well-known, worldwide network comprising several large networks connected together by data links. These links can include, for example, Integrated Digital Services Network (ISDN), T1, T3, FDDI and SONET links. Alternatively, an internet can be a private network interconnecting a plurality of LANs and/or WANs, such as, for example, an intranet. An ISP can provide Internet access services for subscribers such as client 1118*b*.

To establish a connection with an ISP, client 1118*b* can use a host computer connected to a modem (modulator/demodulator) 1130*b*. The modem can modulate data from the host computer into a form (traditionally an analog form) for transmission to the LEC facilities. Typically, the LEC facilities convert the incoming analog signal into a digital form. In one embodiment, the data is converted into the point-to-point protocol (PPP) format. (PPP is a well-known protocol that permits a computer to establish a connection with the Internet using a standard modem. It supports high-quality, graphical user-interfaces.) As those skilled in the art will recognize, other formats are available, including, e.g., a transmission control program, internet protocol (TCP/IP) packet format, a user datagram protocol, internet protocol (UDP/IP) packet format, an asynchronous transfer mode (ATM) cell packet format, a serial line interface protocol (SLIP) protocol format, a point-to-point (PPP) protocol format, a point-to-point tunneling protocol (PPTP) format, a NETBIOS extended user interface (NETBEUI) protocol format, an Appletalk protocol format, a DECnet, BANYAN/VINES, an internet packet exchange (IPX) protocol format, and an internet control message protocol (ICMP) protocol format.

Communications Links

Note that FIGS. 11, 12 and other figures described herein include lines which may refer to communications lines or which may refer to logical connections between network nodes, or systems, which are physically implemented by telecommunications carrier devices. These carrier devices include circuits and network nodes between the circuits including, for example, digital access and cross-connect system (DACS), regenerators, tandems, copper wires, and fiber optic cable. It would be apparent to persons having ordinary skill in the art that alternative communications lines can be used to connect one or more telecommunications systems devices. Also, a telecommunications carrier as defined here, can include, for example, a LEC, a CLEC, an IXC, an Enhanced Service Provider (ESP), a global or international services provider such as a global point-of-presence (GPOP), and an intelligent peripheral.

EO 1104*a* and AT 1206 are connected by a trunk. A trunk connects an AT to an EO. A trunk can be called an inter machine trunk (IMT). AT 1208 and EO 1108*a* are connected by a trunk which can be an IMT.

Referring to FIG. 11, EO 1104 and PBX 1112 can be connected by a private line with a dial tone. A private line can also connect an ISP (not shown) to EO 1104, for example. A private line with a dial tone can be connected to a modem bay or access converter equipment at the ISP. Examples of a private line are a channelized T1 or integrated services digital network (ISDN) primary rate interface (PRI). An ISP can also attach to the Internet by means of a pipe or dedicated communications facility. A pipe can be a dedicated communications facility. A private line can handle data modem traffic to and from an ISP.

Trunks can handle switched voice traffic and data traffic. For example, trunks can include digital signals DS1-DS4 transmitted over T1-T4 carriers. Table 2 provides typical carriers, along with their respective digital signals, number of channels, and bandwidth capacities.

TABLE 2

| Digital signal | Number of channels | Designation of carrier | Bandwidth in Megabits per second (Mbps) |
| --- | --- | --- | --- |
| DS0 | 1 | None | 0.064 |
| DS1 | 24 | T1 | 1.544 |
| DS2 | 96 | T2 | 6.312 |
| DS3 | 672 | T3 | 44.736 |
| DS4 | 4032 | T4 | 274.176 |

Alternatively, trunks can include optical carriers (OCs), such as OC-1, OC-3, etc. Table 3 provides typical optical carriers, along with their respective synchronous transport signals (STSs), ITU designations, and bandwidth capacities.

TABLE 3

| Optical carrier (OC) signal | Electrical signal, or synchronous transport signal (STS) | International Telecommuni-cations Union (ITU) terminology | Bandwidth in Megabits per second (Mbps) |
| --- | --- | --- | --- |
| OC-1 | STS-1 | | 51.84 |
| OC-3 | STS-3 | STM-1 | 155.52 |
| OC-9 | STS-9 | STM-3 | 466.56 |
| OC-12 | STS-12 | STM-4 | 622.08 |
| OC-18 | STS-18 | STM-6 | 933.12 |
| OC-24 | STS-24 | STM-8 | 1244.16 |
| OC-36 | STS-36 | STM-12 | 1866.24 |
| OC-48 | STS-48 | STM-16 | 2488.32 |

As noted, a private line is a connection that can carry data modem traffic. A private line can be a direct channel specifically dedicated to a customer's use between two specified points. A private line can also be known as a leased line. In one embodiment, a private line is an ISDN/primary rate interface (ISDN PRI) connection. An ISDN PRI connection can include a single signal channel (called a data or D channel) on a T1, with the remaining 23 channels being used as bearer or B channels. (Bearer channels are digital channels that bear voice and data information.) If multiple ISDN PRI lines are used, the signaling for all of the lines can be carried over a single D channel, freeing up the remaining lines to carry only bearer channels.

Telecommunications Traffic

Telecommunications traffic can be sent and received from any network node of a telecommunications carrier. A telecommunications carrier can include, for example, a LEC, a CLEC, an IXC, and an Enhanced Service Provider (ESP). In an embodiment, this traffic can be received from a network node which is, for example, a class 5 switch, such as EO 1104*a*, or from a class ¾ switch, such as AT 1206. Alternatively, the network system can also be, for example, a CLEC, or other enhanced service provider (ESP), an international gateway or global point-of-presence (GPOP), or an intelligent peripheral.

Voice traffic refers, for example, to a switched voice connection between calling party 1102*a* and called party 1110*a*. It is important to note that this is on a point-to-point dedicated path, i.e., that bandwidth is allocated whether it is being used or not. A switched voice connection is established between calling party 1102*a* and EO 1104*a*, then to AT 1206 then over an IXC's network such as that of IXC 1106*a* to AT 1208 and then to EO 1108*a* and over a trunk to called party 1110*a*. In another embodiment, AT 1206 or IXC 1106*a* can also be, for example, a CLEC, or other enhanced service provider (ESP), an international gateway or global point-of-presence (GPOP), or an intelligent peripheral.

It is possible that calling party 1102*a* is a computer with a data connection to a server over the voice network. Data traffic refers, for example, to a data connection between a calling party 1102*a* (using a modem) and a server 1122*b* that could be part of an ISP. A data connection can be established, e.g., between calling party 1102*a* and EO 1104*a*, then to AT 1206, then to CLEC 1214, then over a fixed wireless CLEC 1209 link to PBX 1112*b* to a modem 1130*b* associated with server 1122*b*.

A voice-over-Internet Protocol (VoIP) call may also be made and telephony and other data may be delivered over a data transport network using a softswitch and media gateway access devices or the like, in an exemplary embodiment (not shown in FIG. 12).

SS7 Signaled Call Flow

To initiate a call in an SS7 telecommunications network, a calling party using a telephone connected to an ingress EO switch, dials a telephone number of a called party. The telephone number is passed from the telephone to the SSP at the ingress EO of the calling party's local exchange carrier (LEC). First, the SSP can process triggers and internal route rules based on satisfaction of certain criteria. Second, the SSP can initiate further signaling messages to another EO or access tandem (AT), if necessary. The signaling information can be passed from the SSP to STPs, which route the signals between the ingress EO and the terminating end office, or egress EO. The egress EO has a port designated by the telephone number of the called party. The call is set up as a direct connection between the EOs through tandem switches if no direct trunking exists or if direct trunking is full. If the call is a long distance call, i.e., between a calling party and a called party located in different local access transport areas (LATAs), then the call is connected through an inter exchange carrier (IXC) switch. Such a long distance call is commonly referred to as an inter-LATA call. LECs and IXCs are collectively referred to as the public switched telephone network (PSTN).

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A patch panel apparatus comprising:
a plurality of first ports;
a plurality of patch ports;
an electronic monitor of at least one of said plurality of said first ports or said plurality of said patch ports, for existence of any insertable patch cord in at least one of said patch ports, said electronic monitor comprising a sense circuit comprising:
a first port sense circuit of a first of said plurality of said patch ports;
a second port sense circuit of a second of said plurality of said patch ports; and
the any insertable patch cord comprising a plurality of conductors, wherein the any insertable patch cord comprises at least one connector,
wherein said at least one connector comprises at least one of:
a registered jack (RJ) standardized physical network interface connector comprising at least one pin not used for transmission of data and available for sense, said RJ standardized physical network interface connector coupled to said plurality of conductors;
an RJ45 standardized physical network interface connector coupled to said plurality of conductors; or
an RJ69 standardized physical network interface connector coupled to said plurality of conductors,
wherein said plurality of conductors comprises:
a first subset of conductors used for sending data, and
at least one conductor used for sense information,
such that the any insertable patch cord, when inserted in at least one of said first or said second of said plurality of said patch ports, couples said first port sense circuit to at least one of said first port sense circuit, or said second port sense circuit so as to complete said sense circuit, and
wherein the patch panel comprises a direct electronic coupling between contacts of a first of said plurality of said first portsft and contacts of a second of said plurality of said first ports, wherein absence of the any insertable patch cord, at least one of said plurality of said first patch ports is initially electronically coupled to at least one other of said plurality of said first ports, and is adapted to be electronically decoupled upon insertion of the any insertable patch cord.

2. The patch panel of claim 1, wherein said plurality of said first ports and said plurality of said patch ports are part of at least two separate patch panels.

3. The patch panel of claim 1, wherein said plurality of said first ports are part of a first portion of a first patch panel and said plurality of said patch ports are part of a second portion of at least one of said first patch panel or a second patch panel.

4. The patch panel of claim 3, wherein said first portion comprises at least one of a panel, a first panel, a second panel, a front panel, a back panel, a left section, a right section, a top section, a bottom section, a rear portion, a front portion, a top portion, a bottom portion, a left portion, or a right portion, and wherein said second portion comprises at least one of a panel, a first panel, a second panel, a front panel, a back panel, a left section, a right section, a top section, a bottom section, a rear portion, a front portion, a top portion, a bottom portion, a left portion, or a right portion.

5. The patch panel of claim 1, further comprising an indicator.

6. The patch panel of claim 5, wherein said indicator comprises at least one of: a light emitting diode (LED); a single color indicator; a multicolor indicator; at least one pixel, an alphanumeric textual indication; an liquid crystal display (LCD) indicator; a cathode ray tube (CRT); an indicator on the any insertable patch cord; a lamp; a bulb; a remote indication; a local indication; a database field; a display; or a light.

7. The patch panel of claim 5, wherein said indicator is operative to indicate at least one of: activity on at least one of said plurality of said first ports; an indication of existence of the any insertable patch cord in at least one of said plurality of said patch ports; an indication of a powered on status of the panel; or an indication of a power over ethernet (POE) enabled port.

8. The apparatus according to claim 1, further comprising:
a plurality of first indicators corresponding to said plurality of first ports, and
a plurality of second indicators corresponding to said plurality of patch ports.

9. The apparatus according to claim 1, wherein a first indicator is adapted to indicate when activity exists on a corresponding one of said first ports.

10. The apparatus according to claim 1, wherein at least one of said patch ports or said first ports comprise at least one of:
an equipment port;
a line port;
a premises wiring port;
a 110-type punch-down block;
an RJ-45 connection port;
an RJ-46 connection port,
an IBM Cabling System-type port;
a port;
an RJ-11 connection port;
a building wiring port;
a host computer port;
a private branch exchange port;
a data port;
a telephony port;
a DB-25 port;
an RJ-68 port; or
an electronic connector port.

11. The patch panel of claim 1, further comprising a requester adapted to request a trace of the any insertable patch cord; wherein said electronic monitor is adapted to determine at least one of a first end or a second end of the any insertable patch cord, and upon receipt of said request of said trace adapted to indicate the location of at least one of the first end or the second end of the any insertable patch cord.

12. The patch panel of claim 11, wherein said requester comprises: a button, an electronic request, a trace request, an icon, a software application, or a switch.

13. The apparatus according to claim 1, wherein said patch panel further comprises:
a plurality of buttons corresponding to said plurality of patch ports, wherein said plurality of first buttons are adapted to upon receipt of a button depression indicate locations of at least one of a first end or a second end of the any insertable patch cord.

14. The apparatus according to claim 11, wherein said patch panel comprises
a controller adapted to control power from a DC voltage power supply and
to inject power over ethernet (POE) in a direction toward customer premises equipment (CPE), of at least one of said plurality of said first ports.

15. The apparatus according to claim 14, wherein said power is injected onto pins of said plurality of said first ports.

16. The apparatus according to claim 14, wherein said power is injected onto pins of said plurality of said first ports and onto said plurality of said patch ports.

17. The apparatus according to claim 1, wherein said direct electronic coupling comprises at least one of: a relay; a switched relay; a latched switched; a connection; an electrical connection; an electronic connection; a cross-bar switch; an integrated circuit (IC); a chip; a gate; a matrix switch; an electromechanical connection; a software controlled connection; or a coupling.

18. The apparatus according to claim 1, wherein said direct electronic coupling comprises a coupler adapted to at least one of retain or go to a predefined position of coupling in the event of a power failure.

19. The apparatus according to claim 1, wherein said direct electronic coupling comprises means for coupling comprising at least one of means for retaining or means for going to a predefined position of coupling in the event of a power failure.

20. The apparatus according to claim 19, wherein said direct electronic coupling comprises at least one of a switched relay, a latching switched relay, a matrix switch, an integrated circuit (IC), a chip, a gate, a low impedance pass, or a crossbar switch.

21. The apparatus according to claim 1, wherein said patch panel comprises being adapted to automatically switch from a pre-defined coupling to at least one of decoupling or a patched coupling upon electronically recognizing via said electronic monitoring, insertion of the any insertable patch cord inserted in at least one patch port.

22. The apparatus according to claim 1, wherein said coupling is decoupled upon at least one of: insertion of at least one end of said inserted patch cord, or upon insertion of a later of first and second ends of the insertable patch cord being inserted in a given two of said plurality of said patch ports via said sense circuit formed by the at least one sense conductor of the any insertable patch cord.

23. A method of sensing an inserted patch cord through a patch panel having a plurality of patch ports comprising:
monitoring electronically the plurality of patch ports of the patch panel for insertion of any insertable patch cord inserted into at least one of first or second patch ports;
receiving a request for a trace of a patch; and
providing an indication comprising at least one visual or audio indicator corresponding to at least one of a first or a second patch port associated with said patch via a sensing circuit comprising at least one sensing conductor of a plurality of conductors of the any insertable standard patch cord, said conductors used for both sending data and sensing trace information, wherein the at least one sensing conductor of the any insertable standard patch cord electronically couples at least one of said first or said second patch ports to said sensing circuit when the any insertable standard patch cord is inserted in at least one of said first or said second patch ports, and
providing by the patch panel direct electronic coupling between a first of said plurality of said patch ports and a first of a plurality of first ports, wherein in absence of the any insertable standard patch cord, at least one of said plurality of said first patch ports is initially electronically coupled to at least one of said plurality of said first ports, and is adapted to be electronically decoupled upon insertion of the any insertable standard patch cord.

24. The method according to claim 23, wherein said receiving a request for said trace comprises: receiving a closing of a patch sensing switch comprising at least one of a first button corresponding to said first patch port of said patch or a second button corresponding to said second patch port of said patch.

25. The method according to claim 23, wherein said providing an indication comprises providing a visual indication and further comprises:
illuminating a pair of visual indicators corresponding to said first and said second patch ports associated with said patch.

26. A method of providing power over Ethernet (POE) to a plurality of ports comprising:
providing a patch panel having a plurality of ports, said patch panel comprising a controller adapted to control a DC voltage power supply;
injecting controlled DC voltage power from said patch panel in a direction toward a customer premises equipment (CPE), of at least one of said plurality of ports, wherein said ports are electronically monitored for insertion of any insertable standard patch cord inserted into at least one of first or second patch ports, wherein the any insertable standard patch cord comprises at least one sensing conductor of a plurality of conductors of the any insertable standard patch cord, said conductors used for both sending data and sensing trace information, wherein the at least one sensing conductor of the any insertable standard patch cord electronically couples at least one of said first or said second patch ports to a sensing circuit when the any insertable standard patch cord is inserted in at least one of said first and said second patch ports, and
providing by the patch panel direct electronic coupling between a first of said plurality of said patch ports and a first of a plurality of first ports, wherein in absence of the any insertable patch cord, at least one of said plurality of said first patch ports is initially electronically coupled to at least one of said plurality of said first ports, and is adapted to be electronically decoupled upon insertion of the any insertable patch cord.

27. The method according to claim 26, further comprising:
receiving a request for a trace of a patch; and
providing an indication comprising at least one indicator corresponding to the two patch ports associated with said patch via said at least one sensing conductor of the any insertable patch cord.

28. A nontransitory machine-readable storage medium that provides instructions, which when executed by at least one computer processor, cause said at least one computer processor to perform operations comprising a method of sensing an inserted patch cord through a patch panel having a plurality of patch ports comprising:
monitoring electronically the plurality of patch ports of the patch panel for insertion of any insertable patch cord inserted into at least one of first or second patch ports;
receiving a request for a trace of a patch; and
providing an indication comprising at least one visual or audio indicator corresponding to at least one of said first or second patch ports associated with said patch via a sensing circuit comprising at least one sensing conductor of a plurality of conductors of the any insertable standard patch cord, said conductors used for both sending data and sensing trace information, wherein the at least one sensing conductor of the any insertable standard patch cord electronically couples at least one of said first or said second patch ports to said sensing circuit, when the any insertable standard patch cord is inserted in at least one of said first or said second patch ports, and
providing by the patch panel direct electronic coupling between contacts of a first of said plurality of said patch ports and a first of a plurality of first ports, wherein in the absence of the any insertable standard patch cord, at least one of said plurality of said first patch ports is initially electronically coupled to at least one of said plurality of said first ports, and is adapted to be electronically decoupled upon insertion of the any insertable standard patch cord.

* * * * *